(12) United States Patent
Chang et al.

(10) Patent No.: US 9,910,644 B2
(45) Date of Patent: Mar. 6, 2018

(54) INTEGRATED NOTE-TAKING FUNCTIONALITY FOR COMPUTING SYSTEM ENTITIES

(71) Applicant: Microsoft Technology Licensing, LLC, Redmond, WA (US)

(72) Inventors: Jih-Shiang Chang, Bellevue, WA (US); Michelle Li, Seattle, WA (US); Madan Natu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/800,449

(22) Filed: Jul. 15, 2015

(65) Prior Publication Data
US 2016/0259632 A1  Sep. 8, 2016

Related U.S. Application Data

(60) Provisional application No. 62/127,413, filed on Mar. 3, 2015.

(51) Int. Cl.
*G06F 9/44* (2006.01)

(52) U.S. Cl.
CPC ..................... *G06F 8/38* (2013.01)

(58) Field of Classification Search
CPC ..... G06F 8/38; G06F 17/24–17/30011; G06Q 10/10
See application file for complete search history.

(56) References Cited

U.S. PATENT DOCUMENTS

| | | | |
|---|---|---|---|
| 7,689,712 B2 | 3/2010 | Lee et al. | |
| 7,707,518 B2* | 4/2010 | Veselova | G06F 17/3089 715/841 |
| 7,761,785 B2* | 7/2010 | Veselova | G06F 3/0483 715/235 |
| 7,793,233 B1* | 9/2010 | Sellers | G06F 17/241 715/780 |
| 7,823,078 B2 | 10/2010 | Shaburov et al. | |

(Continued)

OTHER PUBLICATIONS

Whitson Gordon, I've Been Using Evernote All Wrong. Here's Why It's Actually Amazing, 2013, pp. 1-13, Retrieved online [http://lifehacker.com/5989980/ive-been-using-evernote-all-wrong-heres-why-its-actually-amazing] on Dec. 2, 2016.*

(Continued)

*Primary Examiner* — Tuan Q. Dam
*Assistant Examiner* — Zheng Wei
(74) *Attorney, Agent, or Firm* — Christopher J. Volkman; Kelly, Holt & Christenson, PLLC

(57) ABSTRACT

A computing system comprises, in one example, a display system configured to generate user interface displays, a first application configured to define an entity in the computing system, an interface component configured to control a second application to generate a notebook component corresponding to the entity, and an association component configured to generate and store an association between the entity and the notebook component. The first application is configured to control the display system to generate a first application user interface display that displays data for the entity in the first application and includes a user input mechanism corresponding to the notebook component in the second application based on the association.

20 Claims, 17 Drawing Sheets

(56) References Cited

U.S. PATENT DOCUMENTS

| | | | |
|---|---|---|---|
| 8,096,477 B2 | 1/2012 | Brown et al. | |
| 8,799,273 B1* | 8/2014 | Chang | G06F 17/3089 |
| | | | 707/722 |
| 8,880,597 B1* | 11/2014 | Pachikov | G06F 21/00 |
| | | | 709/204 |
| 9,152,730 B2* | 10/2015 | Bignert | G06F 17/3089 |
| 9,449,303 B2* | 9/2016 | Underhill | G06Q 10/10 |
| 9,508,056 B2* | 11/2016 | Siu | G06Q 10/10 |
| 2005/0125717 A1* | 6/2005 | Segal | G06F 17/242 |
| | | | 715/201 |
| 2006/0026495 A1* | 2/2006 | Shaw | G06F 17/24 |
| | | | 715/250 |
| 2006/0195461 A1* | 8/2006 | Lo | G06F 17/30011 |
| 2008/0115048 A1* | 5/2008 | Veselova | G06Q 10/10 |
| | | | 715/205 |
| 2008/0115069 A1* | 5/2008 | Veselova | G06F 17/3089 |
| | | | 715/760 |
| 2008/0229199 A1* | 9/2008 | Richardson | G06F 17/30943 |
| | | | 715/714 |
| 2008/0244442 A1* | 10/2008 | Veselova | G06F 9/4443 |
| | | | 715/781 |
| 2008/0270761 A1* | 10/2008 | Rasmussen | G06Q 10/10 |
| | | | 712/209 |
| 2010/0205529 A1* | 8/2010 | Butin | G06F 9/4446 |
| | | | 715/704 |
| 2010/0205530 A1* | 8/2010 | Butin | G06F 9/4446 |
| | | | 715/715 |
| 2011/0145194 A1 | 6/2011 | Figus et al. | |
| 2011/0320944 A1* | 12/2011 | Nikara | G06F 9/4443 |
| | | | 715/716 |
| 2012/0060098 A1* | 3/2012 | Libin | G06F 17/30884 |
| | | | 715/744 |
| 2013/0124513 A1* | 5/2013 | Bignert | G06F 17/30707 |
| | | | 707/728 |
| 2013/0191719 A1 | 7/2013 | Underhill et al. | |
| 2013/0246963 A1* | 9/2013 | Siu | G06F 3/0484 |
| | | | 715/776 |
| 2013/0332804 A1* | 12/2013 | Seaman | G06F 17/243 |
| | | | 715/201 |
| 2013/0346843 A1* | 12/2013 | Murray | G11B 27/34 |
| | | | 715/212 |
| 2014/0047332 A1* | 2/2014 | Liu | G06F 17/24 |
| | | | 715/273 |
| 2014/0304586 A1* | 10/2014 | Hirabayashi | G06F 17/2247 |
| | | | 715/234 |
| 2014/0372405 A1* | 12/2014 | Lee | G06F 17/30864 |
| | | | 707/711 |
| 2014/0376712 A1 | 12/2014 | Mondri et al. | |
| 2014/0380142 A1* | 12/2014 | Mikutel | G06F 17/24 |
| | | | 715/234 |
| 2015/0033102 A1* | 1/2015 | Losvik | G06F 17/21 |
| | | | 715/202 |
| 2015/0046779 A1* | 2/2015 | Akselrod | G06F 17/241 |
| | | | 715/202 |
| 2015/0046827 A1* | 2/2015 | Akselrod | G06F 21/6218 |
| | | | 715/738 |

OTHER PUBLICATIONS

Evernote for Windows User Guide, published by Evernote, p. 1-29, Nov. 14, 2014, Retrieved online from [https://web.archive.org/web/20141114121640/http://tic-recherche.crifpe.ca/docs/guides/en/Evernote_guide.pdf] on Dec. 2, 2016.*

"Integrate Capsule CRM and Evernote", Published on: Sep. 12, 2013, Available at: https://cloudwork.com/integrations/capsule-crm/evernote, p. 1-2.

"Insightly"; Published on: Jul. 16. 2014, Available at: https://www.insightly.com/integrations/evernote/, p. 1-2.

Zerkel, Joshua. "Introducing Evernote Business for Salesforce", Published on: Sep. 27, 2013, Available at: https://blog.evernote.com/blog/2013/09/27/introducing-evernote-for-salesforce/, p. 1-8.

"Cloze", Retrieved on: Mar. 3, 2015, Available at: https://appcenter.evernote.com/app/cloze/ipad, p. 1-3.

"Microsoft Dynamics CRM2OneNote", Published on Nov. 2, 2007, Available at: http://onenotepowertoys.com/2007/11/02/microsoft-dynamics-crm2onenote/, p. 1-5.

McCoy, Kevin, "OnePageCRM—Integration with Evernote", Published on: Aug. 18, 2014. Available at: http://blog.onepagecrm.com/applications-updates/integration-with-evernote, p. 1-5.

Marcucio, "Manage It", Retrieved on: Mar. 3, 2015, Available at: https://appcenter.evernote.com/app/manage-it/web-apps, p. 1-3.

"ZOHO CRM", Retrieved on: Mar. 3, 2015, Available at: http://www.esecforte.com/it-services/zoho-crm/, p. 1-4.

"Zapier—The Best Apps. Better Together.", Retrieved on: Mar. 3, 2015, Available at: https://zapier.com/zapbook/microsoft-dynamics/onenote/, p. 1-5.

"OpenERP Notes", Retrieved on: Mar. 3, 2015, Available at: https://play.google.com/store/apps/details?id=org.bhc.android.notes, p. 1-2.

"SharePoint integration from CRM Online Workflow/Plugin", bearing the date of Dec. 29, 2014, retrieved at <https://code.msdn.microsoft.com/SharePoint-Integration-c5f21604>, retrieved on Oct. 9, 2017, 2 pages.

David Hollingsworth, "Workflow—A Model for Integration": ICL Systems Journal, bearing the date of Nov. 1997, 20 pages.

Tiensoon Law, "Integrate WordPress with Workflow Application", bearing the date of Mar. 23, 2011, retrieved at <https://dzone.com/articles/integrate-wordpress-workflow>, retrieved on Oct. 9, 2017; 8 pages.

* cited by examiner

INTEGRATED NOTE-TAKING FUNCTIONALITY FOR COMPUTING SYSTEM ENTITIES

CROSS-REFERENCE TO RELATED APPLICATION

The present application is based on and claims the benefit of U.S. provisional patent application Ser. No. 62/127,413, filed Mar. 3, 2015, the content of which is hereby incorporated by reference in its entirety

BACKGROUND

Computing systems are currently in wide use. As one example, a computing system stores data as entities or other data records, and commonly includes process functionality that facilitates performing various processes or tasks on the data. Users log into or otherwise access the computing system in order to perform the processes and tasks. The data can include user data as well as entities or records that are used to describe various aspects of the computing system.

An organization may use a computing system to create, track, and manage various aspects of the organization and to conduct a variety of different activities. For instance, a user within the organization may use the computing system to track and process opportunities or commitments with other users or organizations, and to perform entity analysis or management.

The discussion above is merely provided for general background information and is not intended to be used as an aid in determining the scope of the claimed subject matter.

SUMMARY

A computing system comprises, in one example, a display system configured to generate user interface displays, a first application configured to define an entity in the computing system, an interface component configured to control a second application to generate a notebook component corresponding to the entity, and an association component configured to generate and store an association between the entity and the notebook component. The first application is configured to control the display system to generate a first application user interface display that displays data for the entity in the first application and includes a user input mechanism corresponding to the notebook component in the second application based on the association.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 6-1 and 6-2 (collectively referred to herein as FIG. 6) is a flow diagram of one example of a method for implementing note-taking functionality for entities of a computing system.

DETAILED DESCRIPTION

Figure 1:
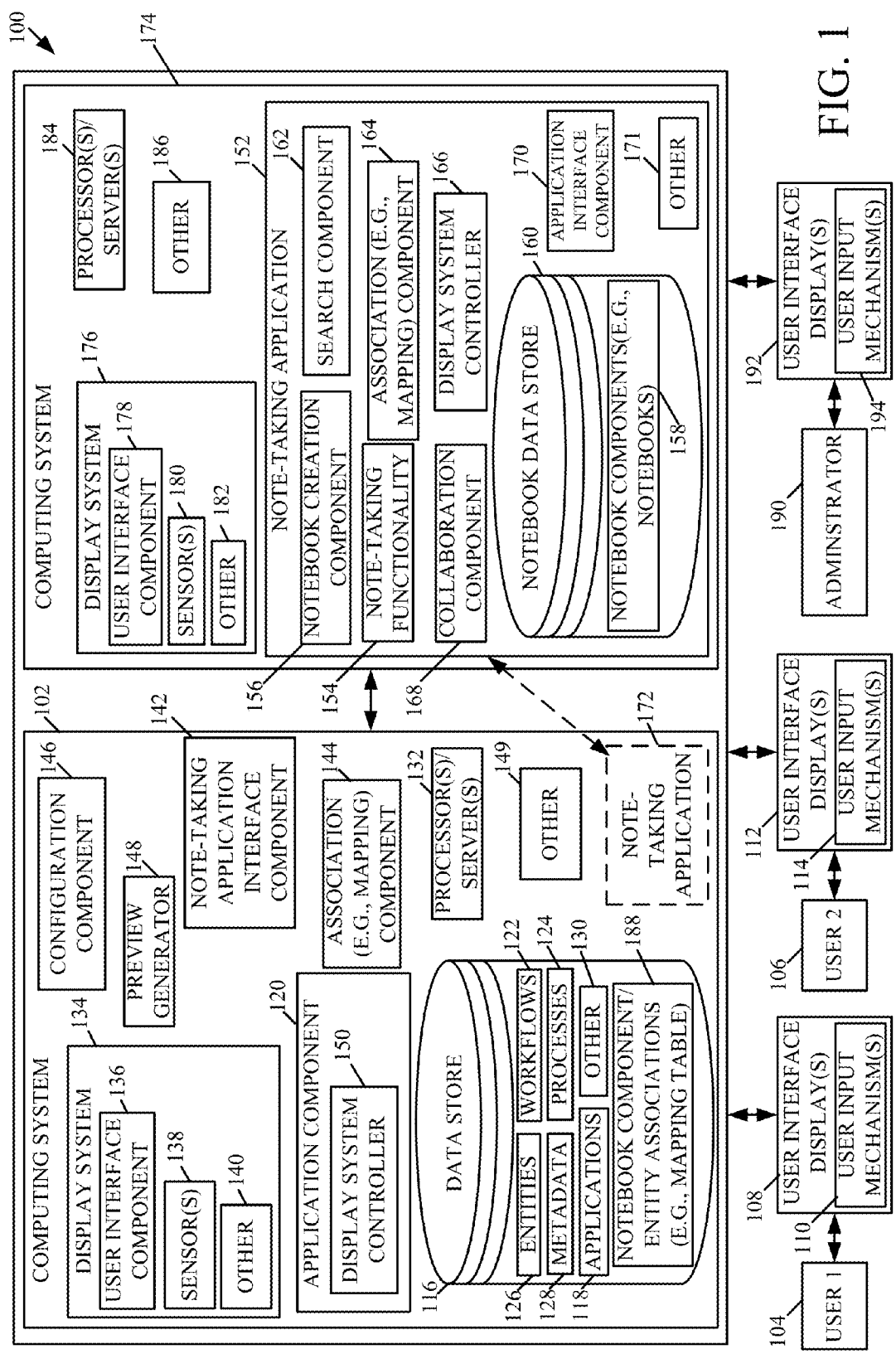
FIG. 1 is a block diagram of one example of a computing system architecture having integrated note-taking functionality.

FIG. 1 is a block diagram of one example of a computing system architecture 100 having integrated note-taking functionality for creating and managing entities in a computing system 102. Computing system architecture 100 is accessible by one or more users through one or more user interface displays. Computing system architecture 100 is shown generating user interface displays 108 with user input mechanisms 110 for interaction by user 104 and user interface displays 112 with user input mechanisms 114 for interaction by user 106. Users 104 and 106 illustratively interact with user input mechanisms 110 and 114 in order to control and manipulate various parts of computing system architecture 100. For sake of illustration, FIG. 1 shows two users interacting with computing system architecture 100. However, it is understood that any number of users can interact with computing system architecture 100.

Each of users 104 and 106 can access components of computing system architecture 100 locally and/or remotely. In one example, one or more of users 104 and 106 use a respective client device that communicates with computing system architecture 100 over a wide area network, such as the Internet.

Users 104 and 106 interact with the user input mechanisms to control and manipulate computing system architecture 100. For instance, users 104 and 106 can access data in a data store 116. User data access can include, but is not limited to, read access, write access, and/or update access to the data. Updating data can include modifying and/or deleting data in data store 116.

User input mechanisms 110 and 114 senses physical activities, for example by generating user interface displays that are used to sense user interaction with computing system architecture 100. The user interface displays can include user input mechanisms that sense user inputs in a wide variety of different ways, such as point and click devices (e.g., a computer mouse or track ball), a keyboard (either virtual or hardware), a keypad, where the display device used to display the user interface displays is a touch sensitive display, the inputs can be provided as touch gestures. Similarly, the user inputs can illustratively be provided by voice inputs or other natural user interface input mechanisms as well.

Computing system 102 can be any type of system accessed by users 104 and/or 106. In one example, but not by limitation, computing system 102 comprises an electronic mail (e-mail) system, a collaboration system, a document sharing system, and/or a scheduling system. In one example, computing system 102 comprises an enterprise system, or other business system, such as an enterprise resource planning (ERP) system, a customer resource management (CRM) system, or a line-of-business system, to name a few.

As such, computing system 102 includes applications 118 that can be any of a variety of different application types. For example, applications 118 can comprise CRM or other business applications. Applications 118 are executed using an application component 120 in order to perform one or more functions within computing system 102.

By way of example, application component 120 accesses information in data store 116 in implementing the programs, workflows, or other operations for users 104 and 106 of computing system 102 to perform processes and tasks. For instance, application component 120, in one example, runs applications 118, which can include workflows 122 and processes 124. Workflows 122 and processes 124, in one example, operate upon data entities or objects 126 and/or metadata 128, as well as other data 130, in order to enable the user to perform his or her operations within system 102. Entities 126 define items within computing system 102. For instance, entities in an enterprise system can include account entities that define various features of an account, customer entities that define various features of a customer, sales entities that define various features of sales that can occur during a sales process, and many other types of entities or objects. Other examples of entities 126 include, but are not limited to, opportunity entities, lead entities, quote entities, product entities. Further, entities 126 can comprise documents, such as articles and emails, to name a few.

Before discussing architecture 100 in further retail, it is noted that FIG. 1 shows a variety of different functional blocks. It will be noted that the blocks can be consolidated so that more functionality is performed by each block, or they can be divided so that the functionality is further distributed. It should also be noted that the above discussion has shown one or more data stores, including data store 116 and a notebook data store 160. Data stores 116 and 160 can be any of a wide variety of different types of data stores. Further, the data in the data stores can consolidated into a same data store, and can be stored in multiple additional data stores as well. Also, the data stores can be local to the environments, agents, modules, and/or components that access them, or they can be remote therefrom and accessible by those environments, agents, modules, and/or components. Similarly, some can be local while others are remote.

In the example shown in FIG. 1, computing system 102 includes processor(s) and/or server(s) 132, a display system 134 (which, itself, includes a user interface component 136 and one or more sensors 138, and it can include other items 140 as well), a note-taking application interface component 142, an association component 144, a configuration component 146, and a preview generator 148. Computing system 102 can include other items 149 as well.

Sensor(s) 138 are configured to detect inputs to display system 134. In one example, one or more of application component 120, interface component 142, association component 144, and configuration component 146 also include sensors configured to detect inputs to those components as well.

While components 120, 142, 144, and 146 are illustrated in FIG. 1 as separate blocks, in one example one or more of these components are consolidated into a single component. For instance, an example application 118 can include interface component 142, association component 144, and/or display system controller 150.

In one example, processor(s) and/or server(s) 132 comprises a computer processor with associated memory and timing circuitry (not shown). The computer processor is a functional part of system 102 and is activated by, and facilitates the functionality of, other systems, components and items in computing system 102.

As illustrated in FIG. 1, user interface component 136 is used by parts of system 102 to generate user interface displays for users 104 and 106, respectively. For example, application component 120 includes a display system controller 150 that is configured to control display system 134 to generate user interface displays 108 and 112 with user input mechanisms 110 and 114 that receive inputs from users 104 and 106 for manipulating application component 120 or for manipulating and interacting with other items in computing system 102.

During use of computing system 102, a user (e.g., user 104 and/or user 106) may desire to create, store, or otherwise maintain certain information related to specific entities in data store 116. For example, user 104 may desire to take notes relative to a given one of entities 126, and may further desire that the notes are shared with and/or collaborated on (e.g., edited in real-time) by one or more other users (e.g., user 106).

Computing system 102 incorporates note-taking capabilities that allows users to create, modify, delete, collaborate, or perform any other suitable functions relative to entities 126 within computing system 102. In the illustrated example, architecture 100 includes a note-taking application 152 that is illustratively a free-form information gathering and multi-user collaboration platform that enables users to store notes, drawings, screen clippings, audio, video and any other item of content or document as part of a collection of content.

Note-taking application 152 includes note-taking functionality 154 and a notebook creation component 156 configured to create notebook components 158 that are stored in notebook data store 160. In one example, a notebook component is utilized as a centralized mechanism for creating and managing entities within computing system 102. Users of the computing system are provided with centralized access to the notebook component and thus are able to update the notebook component for an entity collaboratively and in real time. Updates to the notebook component can originate from an application data source outside of note-taking application 152 itself.

Examples of note-taking functionality 154 include functionality for a user to store plain text, and handwritten notes or drawings in associated with a given entity 126. Another example includes functionality for a user to attach files, photos, and recorded voice notes in association with a given entity 126. Another example includes functionality for a user to convert business cards, preserve HTML and hyperlinks, and to embed images and screenshots or clippings into the corresponding notes. In another example, external feeds or emails from a first application 118 can be pushed to note-taking application 152. For instance, a user using an example application 118 that processes an email pertaining to a given entity 126 can utilize functionality of note-taking application 152 to store the email into a notebook component 158.

Examples of a notebook component 158 include, but are not limited to, a notebook, a section within a notebook, a page within a section, a collection of sections or pages, etc.). Note-taking application 152 also includes, in one example, a search component 162 configured to search notebook components 158, an association component 164, a display system controller 166 configured to control a display system to generate user interface displays, a collaboration component 168, and an application interface component 170. Note-taking application 152 can include other items 171 as well.

In one example, application interface component 170 is configured to communicate with application component 120, and/or other components of computing system 102, to send and receive data with those components. For example, application interface component 170 is configured to send an indication to an application 118, such as through API call(s), that a user has actuated an entity link in a notebook component, upon which the application 118 generates a corresponding user interface display for that entity.

In one example, a notebook is arranged in a generally hierarchical fashion. For instance, a notebook can have multiple different sections or chapters, and each section can have multiple different pages. Each page can have multiple different documents located thereon or embedded therein. With respect to the present discussion, the term document means a collection of content. For instance, a document may be a word processing document or a page in the document, or it may be a spreadsheet or even a page in the spreadsheet, a video or audio file, a slide presentation or individual slides in the presentation, a set of drawings in a drawing document or the individual drawings, notes entered on a page using free form text entry, or any other similar type of content collection.

The documents and/or other content can be collected and stored as part of notebook components 158. Access to the content can be shared among the users based on certain preferences and system settings. When one or more of the users wish to share all or parts of a notebook with other of the users, functions are included within the note-taking application 152 to facilitate this.

In one example, note-taking application 152 differs from a traditional word processing application at least in that it is much more free-form in terms of how and where the user is able to submit content into the application user interface for storage as part of notebook components. Further, in one example, users of note-taking application 152 generally are not required to issue a save order or command because note-taking application 152 automatically saves the data as part of the notebook component as it is entered.

As has been described, note-taking application 152 supports a multi-user environment wherein the content collections may be shared. In one example, application 152 allows off-line editing and later synchronization. In another example, application 152 allows collaboration in that more than one user can work on the same notebook component at the same time. For example, a notebook component 158 can be stored in and retrieved from notebook data store 160 using collaboration component 168 that provides a collaborative platform.

These are but examples of features of an example note-taking application 152. The scope of the present system is not limited to a system that includes an exact combination and configuration of features as described. Other configurations and features should also be considered within the scope.

Further, note-taking application 152 can reside on any of a variety of systems. In one example, note-taking application 152 resides on computing system 102. This is represented by block 172. In the example illustrated in FIG. 1, note-taking application 152 resides on a second computing system 174, that is separate from computing system 102. Computing system 174 can include a display system 176 (which, itself, includes a user interface component 178 and one or more sensors 180, and it can include other items 182 as well), and processor(s) and/or server(s) 184. Computing system 174 can include other items 186 as well. In one example, display system 176 and processor(s)/server(s) 184 are substantially similar to display system 134 and processor(s)/server(s) 132, discussed above. Sensor(s) 180 are configured to detect inputs to display system 176. In one example, note-taking application 152 also includes sensor(s) configured to detect inputs to application 152.

In one example, some or all the note-taking functionality is provided by a client side application component. That is, in one example, note-taking application 152 includes application components that run at least partially from a client device used by user 104. Alternatively, or in addition, application 152 is partially, primarily, or completely operable from a network location, for example, from within a network architecture (e.g., a cloud). In this case, any or all of the user devices can include a separate application such as a network browser application for facilitating interaction with note-taking application 152. For instance, note-taking application 152 can be provided via a remote server that extends note-taking functionality to a web browser, enabling users to work with notebook directly on a website where the notebook is stored. Any combination of remote or client-based distribution of functions or components of note-taking application 152 are to be considered within the scope of the present disclosure.

Regardless of where the note-taking application resides, the illustrated example leverage its note-taking functionality to create, store, and manage date for entities within computing system 102. As such, the present infrastructure advantageously provides an immersive note-taking experience that can be shared across different devices and clients. By way of example, note-taking application 152 allows a user to interject information, in the form of notes, within a different application context (e.g., application 118 or other application that does not support note-taking functionality) to track, manage, or analyze entities 126. The notes, which can comprise a specific notebook, section, or page, is mapped to the corresponding entity 126 to allow the notes to be later recalled and/or edited by a user, which can be the user that originally created the notes or another user. This leverages the rich note-taking functionality of note-taking application 152 while creating and managing entities within computing system 102.

In one example, for an entity record in data store 116, note-taking application interface component 142 interfaces (e.g., through one or more application programming interface (API) calls) to note-taking application 152 to create a specific location for a collection of notes (e.g., a notebook component, such as a specific notebook, section, page, etc.). Association component 144 associates that entity record with the specific location of the notes in note-taking application 152, for example by generating and storing a mapping between the entity record and the note location in application 152.

By way of illustration, for a given opportunity entity in data store 116 created by user 104 using an application 118, component 142 automatically controls note-taking application 152 to create a notebook (or other notebook component 158) that is stored in notebook data store 160. In one example, user 104 (or another user) can then see notes in the notebook from within application 118, as well as access the notes directly from note-taking application 152. Any subsequent notes that user 104 creates in that notebook are automatically associated with given opportunity entity. User 104 can also specify additional locations of notes (such as other notebooks) to associate with the opportunity entity, while the note structure and storage is still controlled and managed by user preference in the note-taking application 152. Further, the information in the notebook can be accessed and edited by user 104 through note-taking application 152 or application 118. In one example, search component 162 includes search functionality that allows a user to perform a full content search of the notebook. In one example, each page of the notebook supports a version history of the information on the page. Further, using collaboration component 168, the notebook can also be used by other users (e.g., user 106) of architecture 100 to create and share notes for the opportunity entity. Any other notes created within that notebook are associated with the opportunity entity.

Each association between an entity 126 and the corresponding notebook component 158, or a portion thereof, is created and maintained by association component 144. Using this association, an application 118 being used by user 104 can show a quick preview generated by preview generator 148 on the notes from application 152 and create deep links for navigation to those notes. In the above example, for instance, upon creation of a notebook for the opportunity entity, interface component 142 receives an indication from application 152 of the notebook's location (e.g., a notebook URL or other suitable pointer) and uses association component 144 to create a mapping between the opportunity entity and the notebook. In one example, association component 164 of note-taking application 152 also creates an association between the notebook and the opportunity entity to facilitate user navigation from application 152 to the opportunity entity. This is discussed in further detail below. Briefly, however, association component 164 can insert a URL, or other link or pointer, into the notebook that, upon actuation by the user, navigates the user to the opportunity entity in system 102.

In one example, association component 144 creates and maintains notebook component/entity associations 188, which can be stored in data store 116. In one example, associations 188 are defined in a mapping table, or other type of mapping structure, having a plurality of entries, each entry associating a given entity with a given notebook component. One example of a mapping table 200 is illustrated in FIG. 2.

Figure 2:
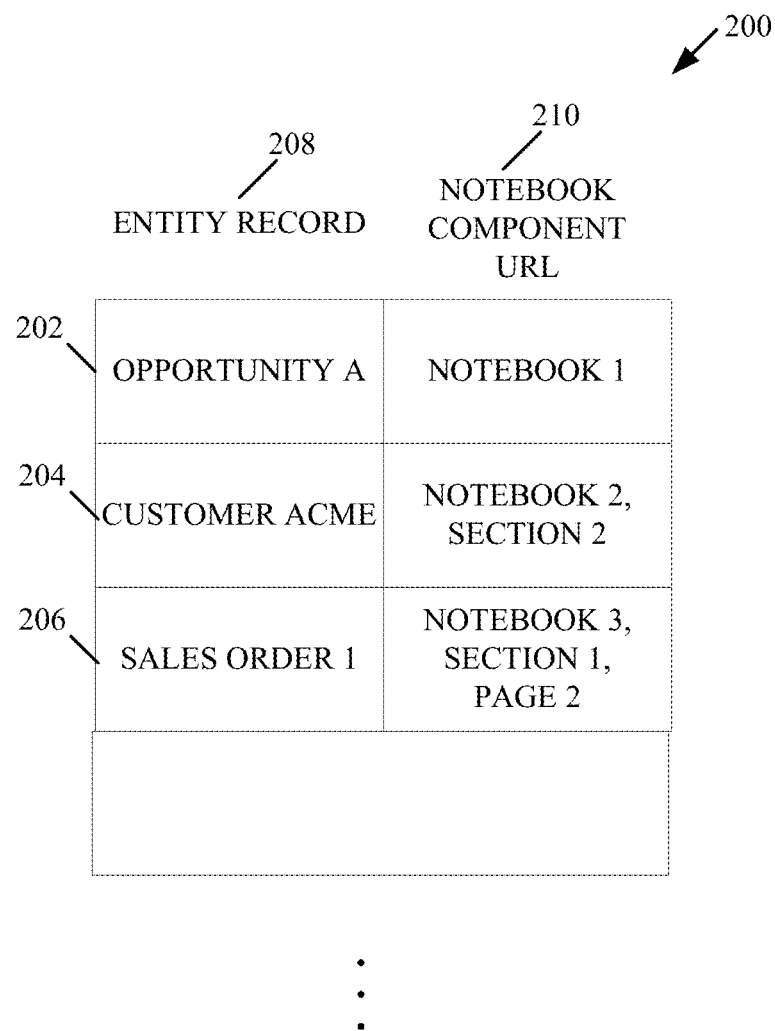
FIG. 2 illustrates one example of a mapping table.

As shown in FIG. 2, mapping table 200 includes a plurality of entries (i.e., entries 202, 204, and 206) each mapping or otherwise associating a particular entity with a particular notebook component. Mapping table 200 includes a first column 208 that identifies the entity and a second column 210 that identifies the URL or other pointer to the notebook component. Mapping table 200 is utilized by components of computing system 102 to identify a particular notebook component 158 of note-taking application 152. In this manner, associations 188 can be used by applications 118 to identify an existing notebook component 158 for a given entity being used by the application. For instance, user 104 may wish to access and/or author notes for an opportunity entity created by application 118.

Figure 3:
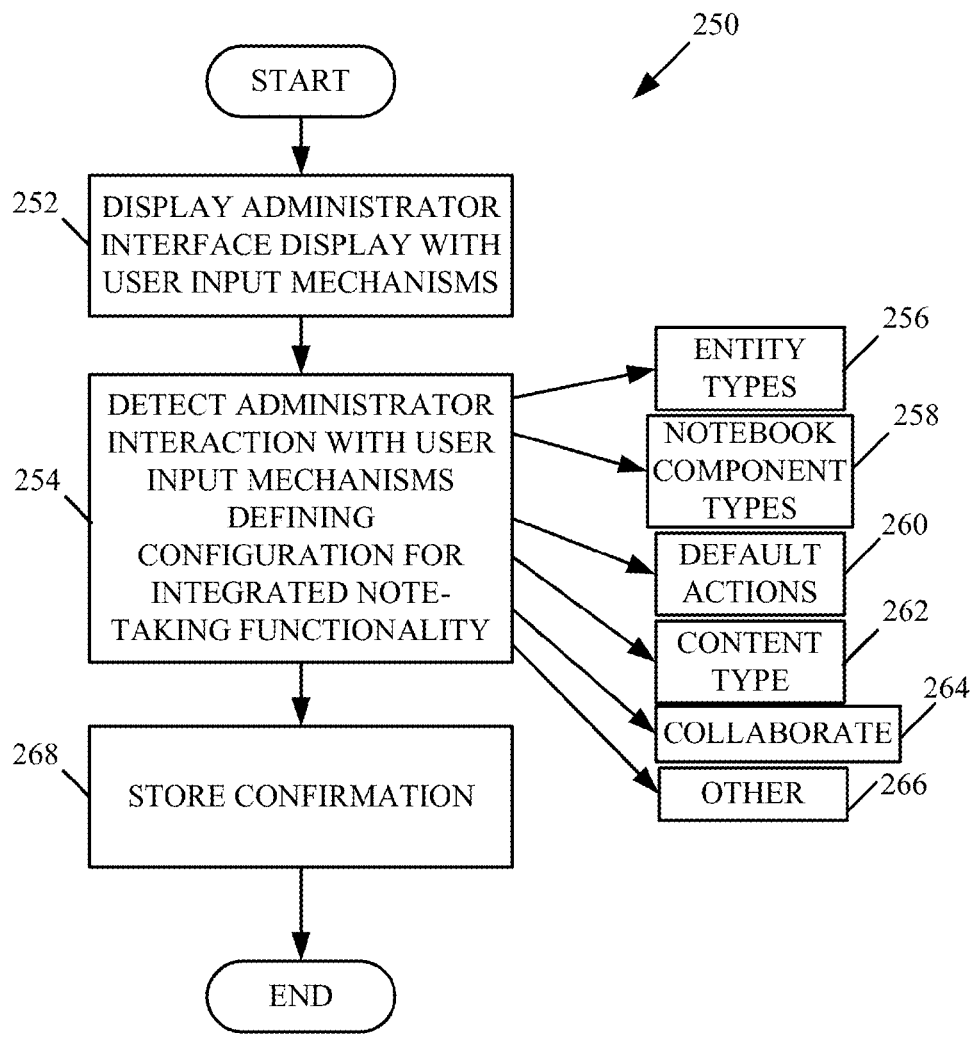
FIG. 3 is a flow diagram of one example of a method for configuring note-taking functionality within a computing system.

Referring again to FIG. 1, configuration component 146, in one example, is utilized by an administrator 190 to configure the integration of note-taking application 152. As shown in FIG. 1, administrator 190 is presented with one or more user interface displays 192 having user input mechanisms that detect interaction by administrator 190. User interface displays 192 allow administrator 190 to define how the note-taking functionality of application 152 is incorporated into computing system 102. FIG. 3 illustrates one example of a method 250 for configuring note-taking functionality within computing system 102. For sake of illustration, but not by limitation, method 250 will be described in the context of administrator 190 utilizing configuration component 146.

Figure 4:
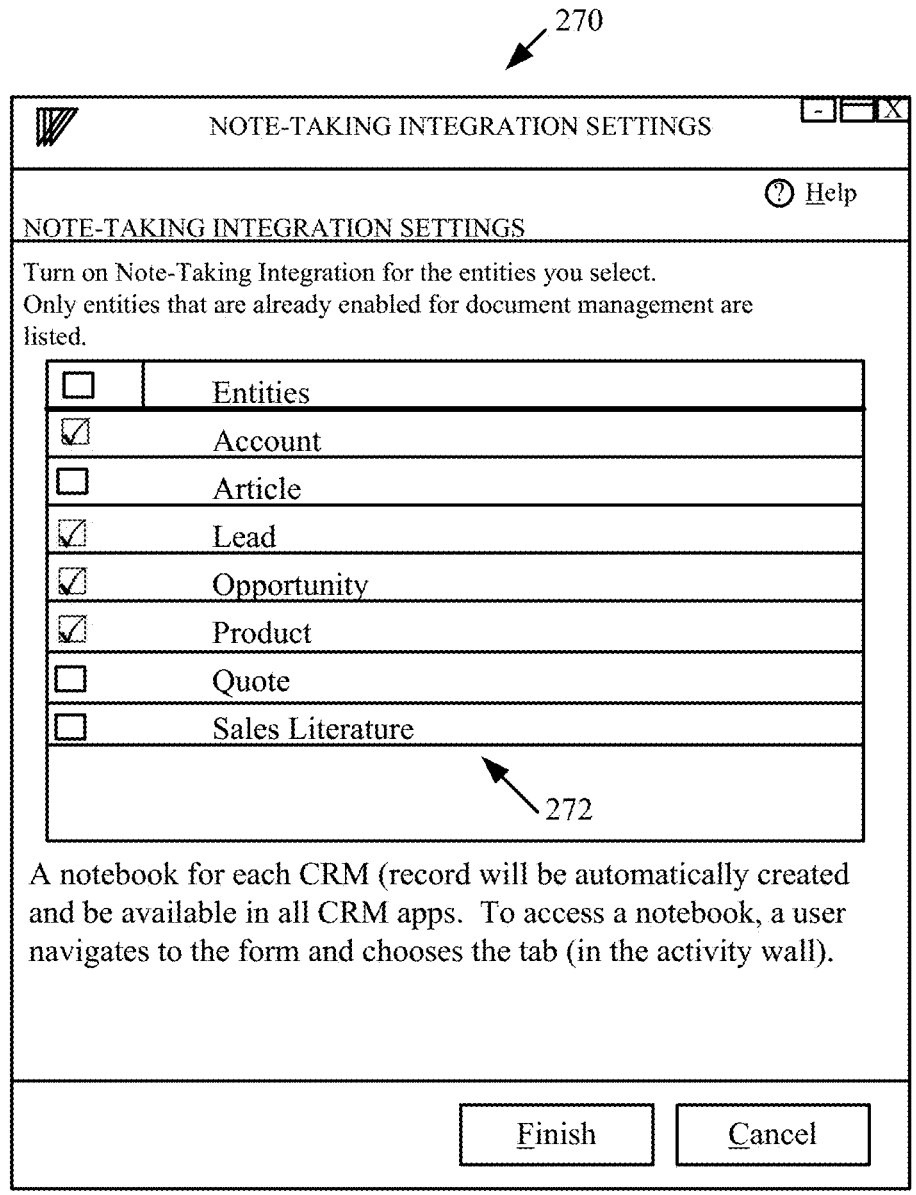
FIG. 4 illustrates one example of a user interface display having user input mechanisms for an administrator to configure note-taking functionality within a computing system.

At step 252, an administrator interface display with user input mechanisms is displayed to administrator 190. Administrator (or other user) interactions with the user input mechanisms are detected (for example using sensors 138) at step 252. These interactions define a configuration for the integrated note-taking functionality. In one example, administrator 190 can define the types of entities for which to create notebook components. This is represented by block 256. FIG. 4 illustrates one example of a user interface display 270 having user input mechanisms for administrator 190 to define entity types. As shown in FIG. 4, display 270 includes a list 272 of entities for which the note-taking functionality can be enabled. From list 272, administrator 190 selects a desired subset (some or all entities in list 272) for which the administrator desires to have notebook components created. In the illustrated example, administrator 190 has selected the account, lead, opportunity, and product entities. As such, when a user creates a new account entity, lead entity, opportunity entity, or product entity, note-taking application interface component 142 controls notebook creation component 156 to create a corresponding notebook for that entity. However, if user 104 creates a new article entity, quote entity, or sales literature entity, a notebook component is not created for that entity.

Figure 5:
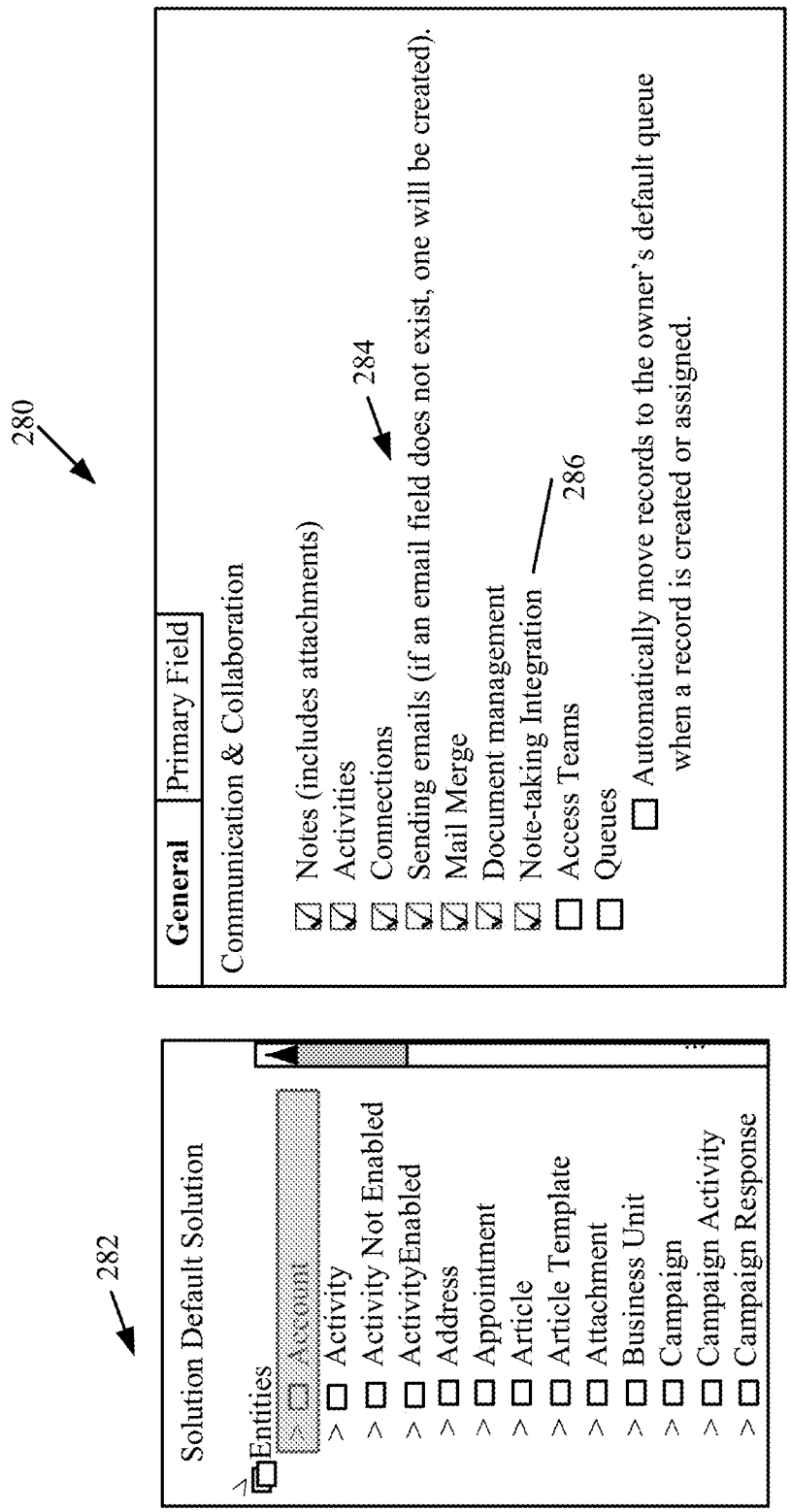
FIG. 5 illustrates one example of a user interface display having user input mechanisms for an administrator to configure note-taking functionality within a computing system.

FIG. 5 illustrates another example of a user interface display 280 for administrator 190 to configure the integrated note-taking functionality. User interface display 280 includes a list 282 of entities that are selectable by administrator 190. Upon selection of a particular entity (i.e., the account entity in the present example), administrator 190 is presented with configuration options, which are provided in a user interface display portion 284. For instance, portion 284 allows administrator 190 to define, for the account entity, whether the note-taking functionality is enabled for the entity. This is represented by reference numeral 286.

Referring again to FIG. 3, the administrator interface display can also facilitate administrator 190 defining the types of notebook components to be created for the entities. This is represented by block 258. For example, for a given entity, administrator 190 can define that a notebook is to be created each time an entity of that type is created. In another example, administrator 190 can define that a section or a page within a notebook is created within a notebook for each entity.

In another example, administrator 190 can define a default action to be performed when creating a notebook component. For example, administrator 190 can define that data from a first application (e.g., application 118), such as a CRM application, is to be automatically sent to application 152 for storage in the corresponding notebook component. In another example, administrator 190 can define a type of content for which to provide note-taking functionality. For example, administrator 190 can define that emails or other specific types of data are to be provided through interface component 142 to storage in the notebook component. This is represented by block 262. In another example, administrator 190 can define whether to allow user collaboration on the notebook component. This is represented by block 264. For example, administrator 190 can define that collaboration is allowed for notebooks created for account entities but not for notebooks created for product entities. Of course, other configuration parameters can be defined by administrator 190. This is represented by block 266.

At step 268, the configuration is stored and can be accessed at runtime by application interface component 142 to control the integration of note-taking functionality 154. Based on the stored configuration parameters, note-taking application interface component 142 controls note-taking application 152 to implement the relevant note-taking functionality 154. In one example, component 142 controls application 152 through a set of API calls.

Figures 1, 6:
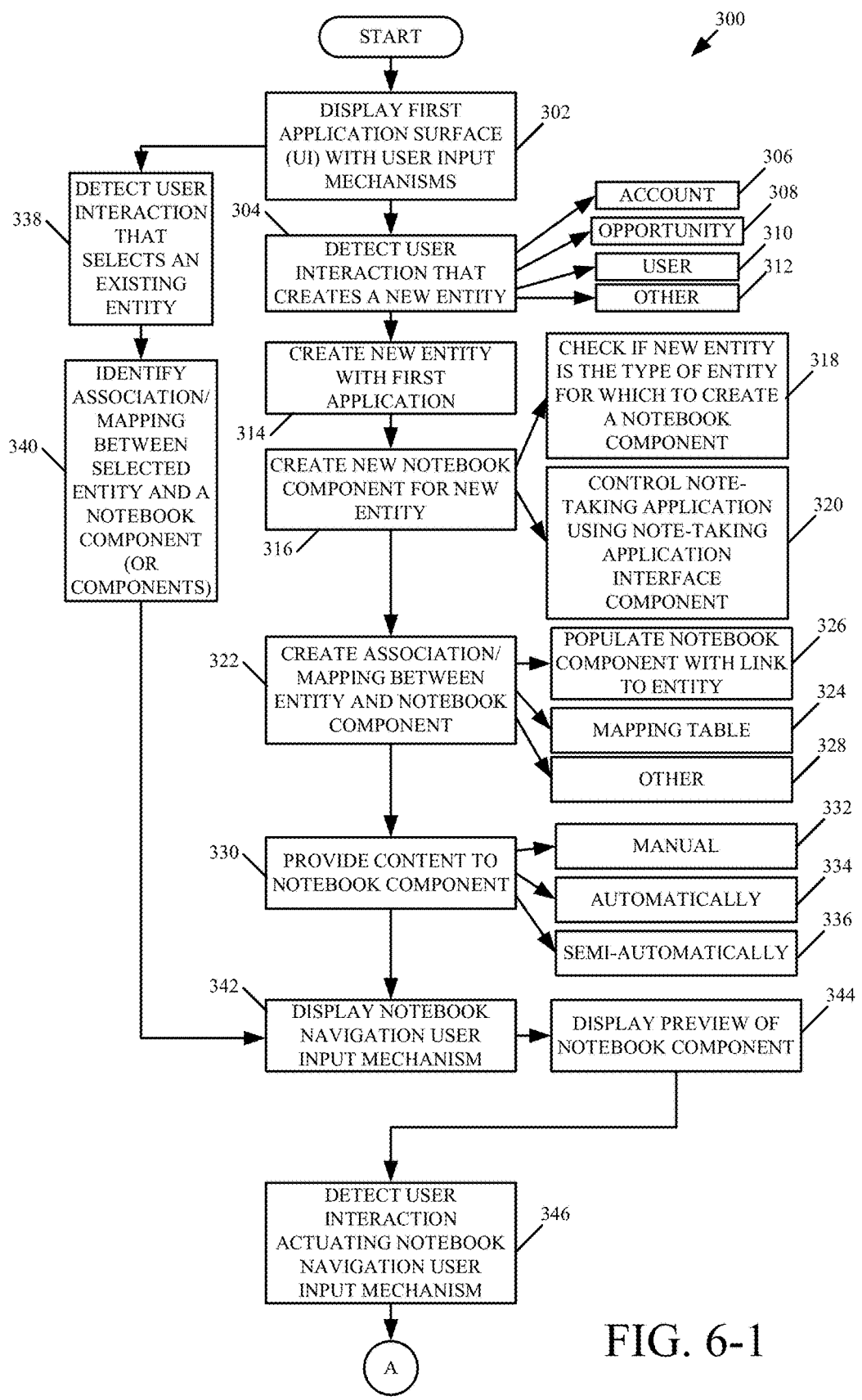
Figures 2, 6:
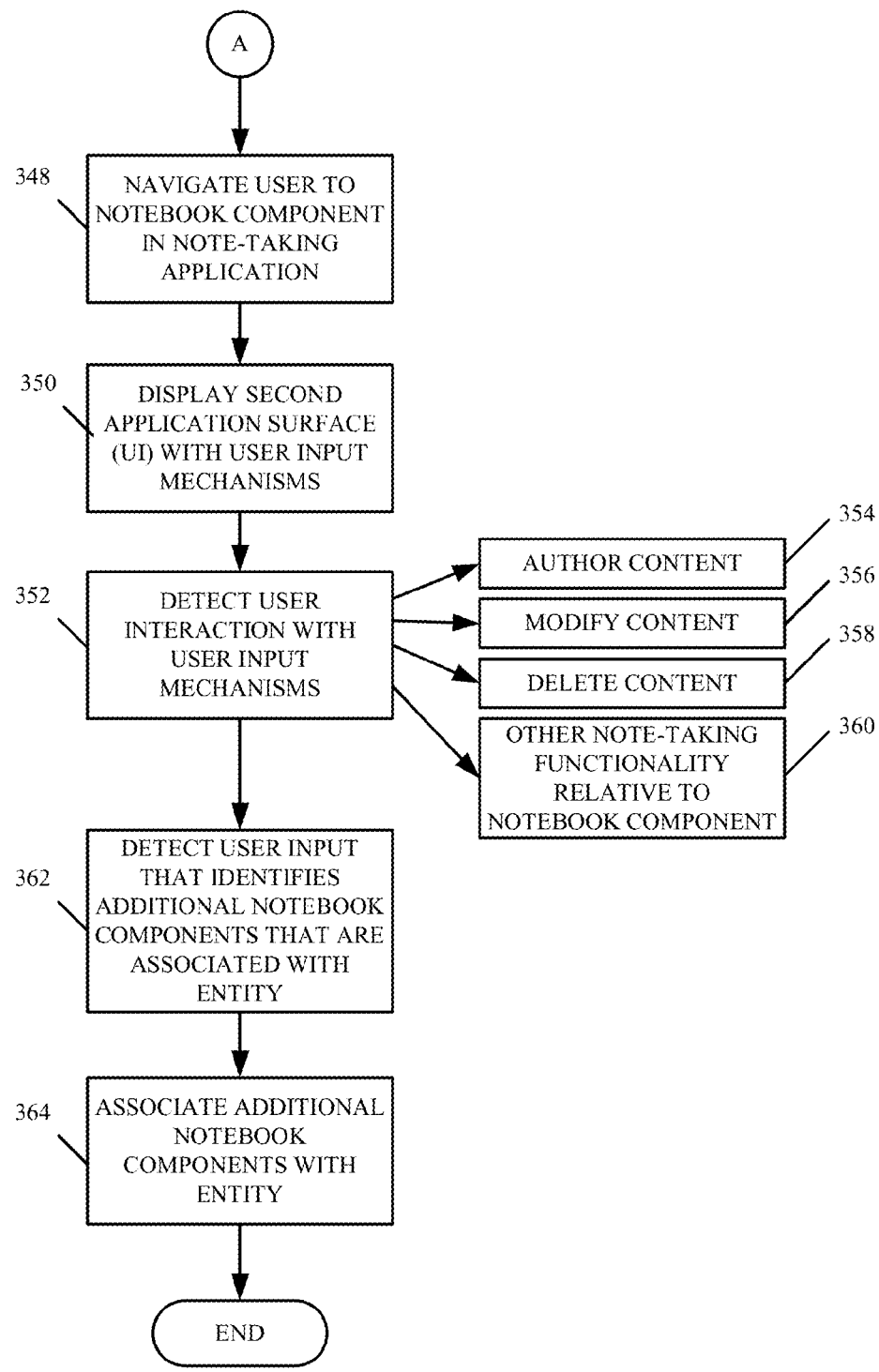

FIGS. 6-1 and 6-2 (collectively referred to as FIG. 6) illustrates one example of a method 300 for implementing note-taking functionality for entities of a computing system. For sake of illustration, but not by limitation, method 300 will be described in the context of user 104 using a first application 118 for which note-taking functionality 154 of note-taking application 152 is incorporated using interface component 142.

At step 302, a user interface display, or other application surface, is displayed with user input mechanisms. For example, user 104 opens an application 118 and is presented with a user interface display for viewing, adding, modifying, and deleting entities 126 in data store 116.

Figure 7:
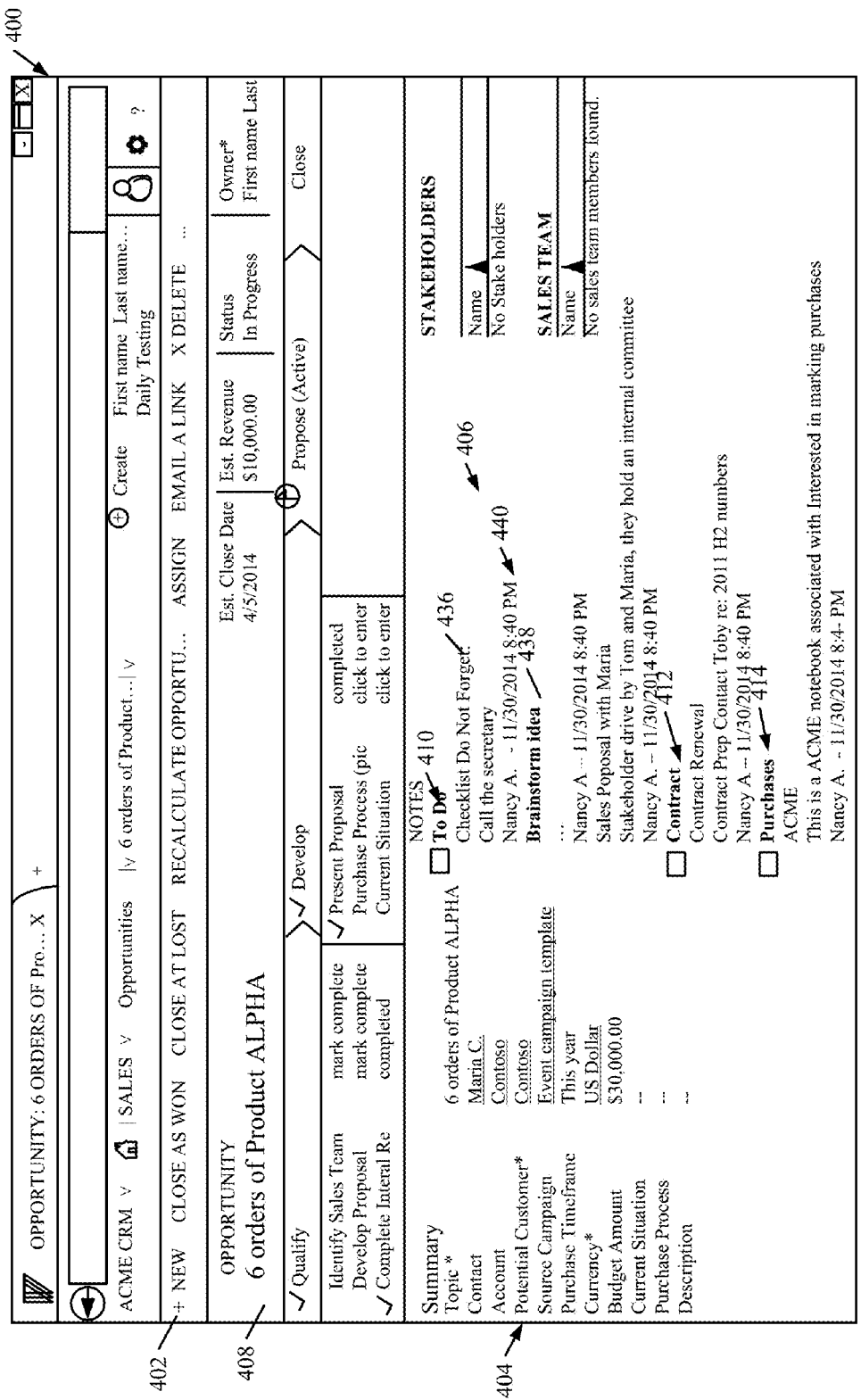
FIG. 7 illustrates one example of a user interface display through which a user creates a new entity in a computing system.

At step 304, a user interaction with the user input mechanisms is detected that creates a new entity. For example, user 104 can create a new account entity 306, opportunity entity 308, user entity 310, or other entity 312. FIG. 7 illustrates one example of a user interface display 400 through which user 104 can create a new entity (an opportunity entity in the example of FIG. 7). User interface display 400 includes a user interface element 402 for creating the new entity and a display portion 404 that displays information for the entity from data store 116.

Referring again to FIG. 6, at step 314, the new entity is created with application 118 and stored in data store 116. At step 316, note-taking application interface component 142 automatically creates a new notebook component (e.g., a new notebook, a new section within an existing notebook, a new page within an existing section, a collection of sections or pages, etc.) for the new entity, for example by controlling notebook creation component 156. In one example, interface component 142 checks the configuration parameters to determine whether the new entity is of a type of entity for which to create notebook components. If so, interface component 142 controls note-taking application 152 at step 320.

At step 322, a mapping or other association is created between the entity and the notebook component. For example, an entity is created in a mapping table, such as mapping table 200. In one example, association component 164 of note-taking application 152 also generates a association between the entity and notebook component. In one example, the notebook component is populated with a link to the entity, such as a URL or other navigation element. This is represented by block 326. The association can be created in other ways as well. This is represented by block 328.

In one example, at step 330, content is provided from application 118 to note-taking application 152 for storage in the notebook component. This can be done manually (represented by block 332), automatically (represented by block 334), or semi-automatically (represented by block 336). For example, content can be pushed to application 152 for storage in the notebook component. In another example, the user can author or otherwise provide content for the notebook component using a user interface of applications 118 and/or 152.

Referring again to step 302, in another example, the detected user interaction can select an existing entity from data store 116. This is represented by block 338. For example, the user can select the opportunity entity illustrated in FIG. 7. Association component 144 can be used to identify an association between the selected entity and a notebook component (or components). This can be done by accessing stored associations 188 that map an entity 126 to one or more notebook components 158.

At step 342, a notebook navigation user input mechanism is displayed that facilitates user navigation to the associated notebook component. To illustrate, in the example of FIG. 7, user interface display 400 includes a set of user interface elements 406 that each correspond to a particular notebook component associated with the opportunity entity 408. In the illustrated example, a first element 410 corresponds to a first notebook component, a second element 412 corresponds to a second notebook component, and a third element 414 corresponds to a third notebook component. Each of elements 410, 412, and 414 include an actuatable link or mechanism that, when actuated by the user, navigates the user to the corresponding notebook component in note-taking application 152.

Figure 8:
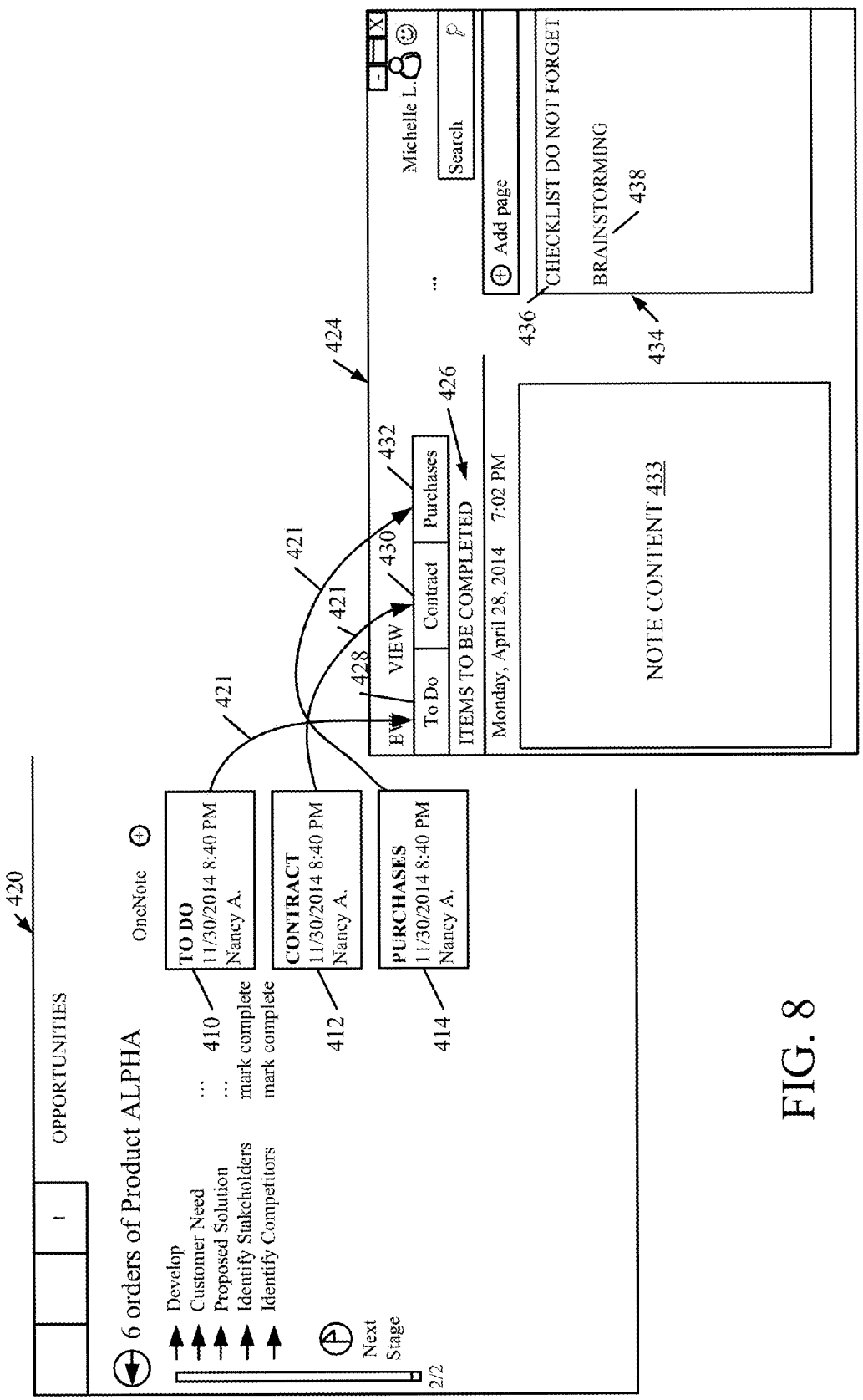
FIG. 8 illustrates an example user interface display providing a view of an opportunity entity shown in FIG. 7.

For sake of illustration, FIG. 8 shows a user interface display 420 providing another view of the opportunity entity illustrated in FIG. 7 and how the elements 410, 412, and 414 are mapped to the corresponding notebook components associated with the opportunity entity. The notebook components are displayed in a second user interface display 424, and the mappings are represented by arrows 421. In FIG. 8, user interface display 424 is generated by note-taking application 152, and includes a plurality of tabs 426 that each correspond to a particular section of a notebook. That is, element 410 corresponds to a first section represented by tab 428, element 412 corresponds to a second section represented by tab 430, and element 414 corresponds to a third section represented by tab 432. Each of elements 410, 412, and 414 are actuatable to navigate to the corresponding section within the notebook displayed in interface display 424.

As also shown in FIG. 8, for a selected section (i.e., tab 428 in the present example), note content 433 and a list of pages 434 are displayed. That is, within the selected section, there are illustratively two pages represented by page navigation elements 436 and 438. Each of these elements 436 and 438 are selectable to navigate the user to the corresponding page.

Referring again to FIG. 6, in one example preview generator 148 generates a preview of the notebook component, which can be displayed at step 344. In the example of FIG. 7, a display preview 440 is provided for the notebook component. That is, display preview 440 displays content from the pages represented by elements 436 and 438 (shown in FIG. 8).

At step 346, a user interaction actuating a notebook navigation user input mechanism is detected. In response, the user is navigated to the corresponding notebook component at step 348. In navigating the user to the notebook component, a user interface display or other application surface for the second application (i.e., note-taking application 152) is displayed with user input mechanisms at step 350.

Figure 9:
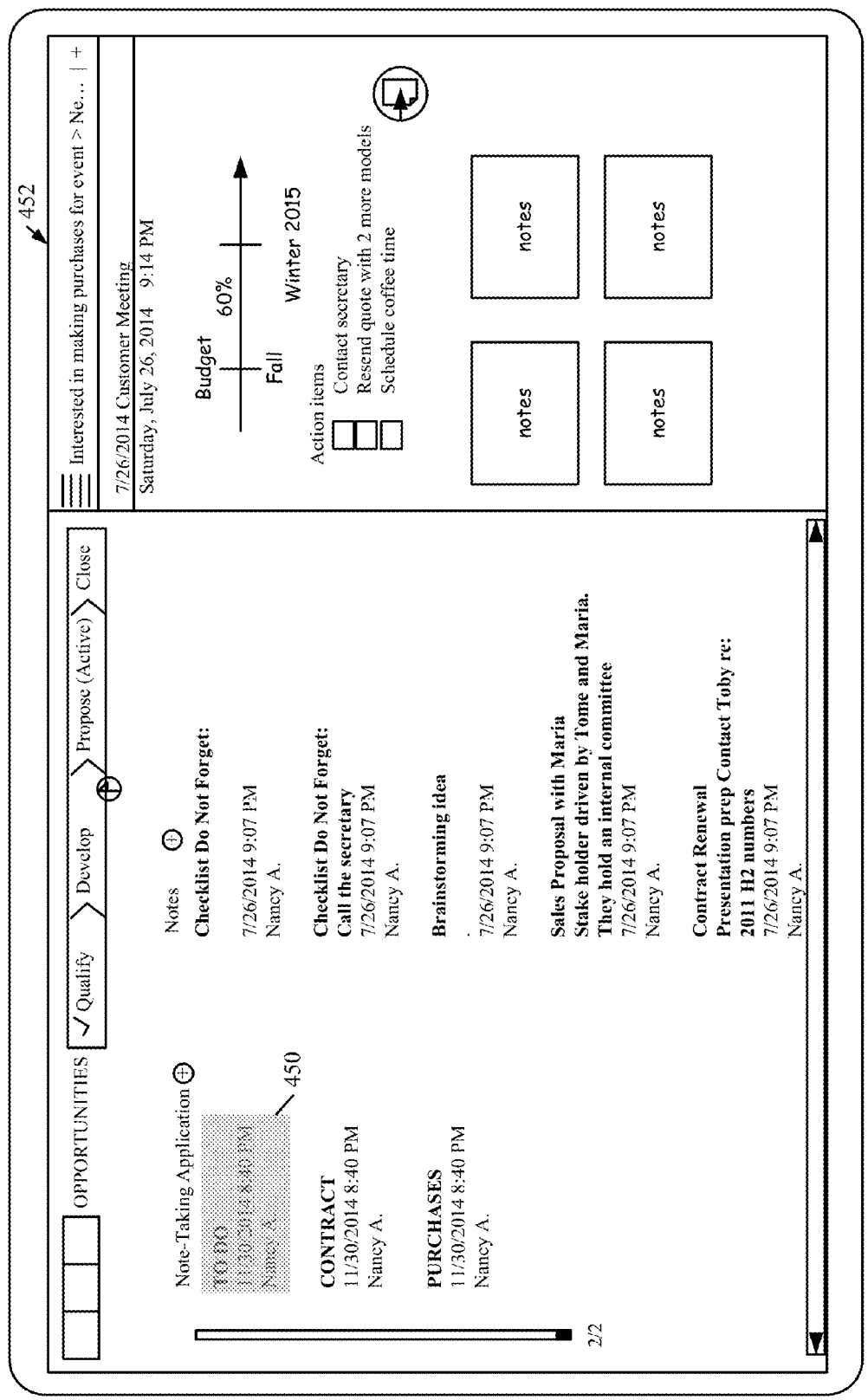
FIG. 9 illustrates example user interface displays for navigating a user to a corresponding notebook component.

FIG. 9 illustrates one example of navigating the user to a corresponding notebook component at steps 346-350, in the context of a client device, such as a tablet computer, that runs the first application and the note-taking application. In the illustrated example, from within the first application (e.g., a CRM application) the user selects user interface element 450, corresponding to a particular notebook section. In response to this selection, the client device opens a user interface display 452 for the note-taking application, which includes content from the selected notebook section. In the context of a web-based implementation in which the user utilizes a web browser to access the applications, actuation of the notebook navigation user input mechanism at step 346 causes, in one example, an additional web browser window or tab to open with a user interface display for the note-taking application. These, of course, are examples only. Other implementations are within the scope of the present disclosure.

Referring again to FIG. 6, the user interface display for note-taking application 152 can include user input mechanisms that facilitate note-taking functionality 154. At step 352, user interaction with those user input mechanisms are detected. This can include the user authoring content (represented by block 354), modifying content (represented by block 356), deleting content (represented by block 358), or other note-taking functionality relative to the notebook component (represented by block 360).

At step 362, a user input is detected that identifies additional notebook components that are associated with the entity. In the context of the FIG. 7 example, at step 362 the user can select another existing notebook stored in data store 160 as being associated with the opportunity entity. In response, association component 144 associates the additional notebook component with the entity at step 364. For example, association component 144 can create another entry in the mapping table that associates the entity with the additional notebook component.

Figure 10:
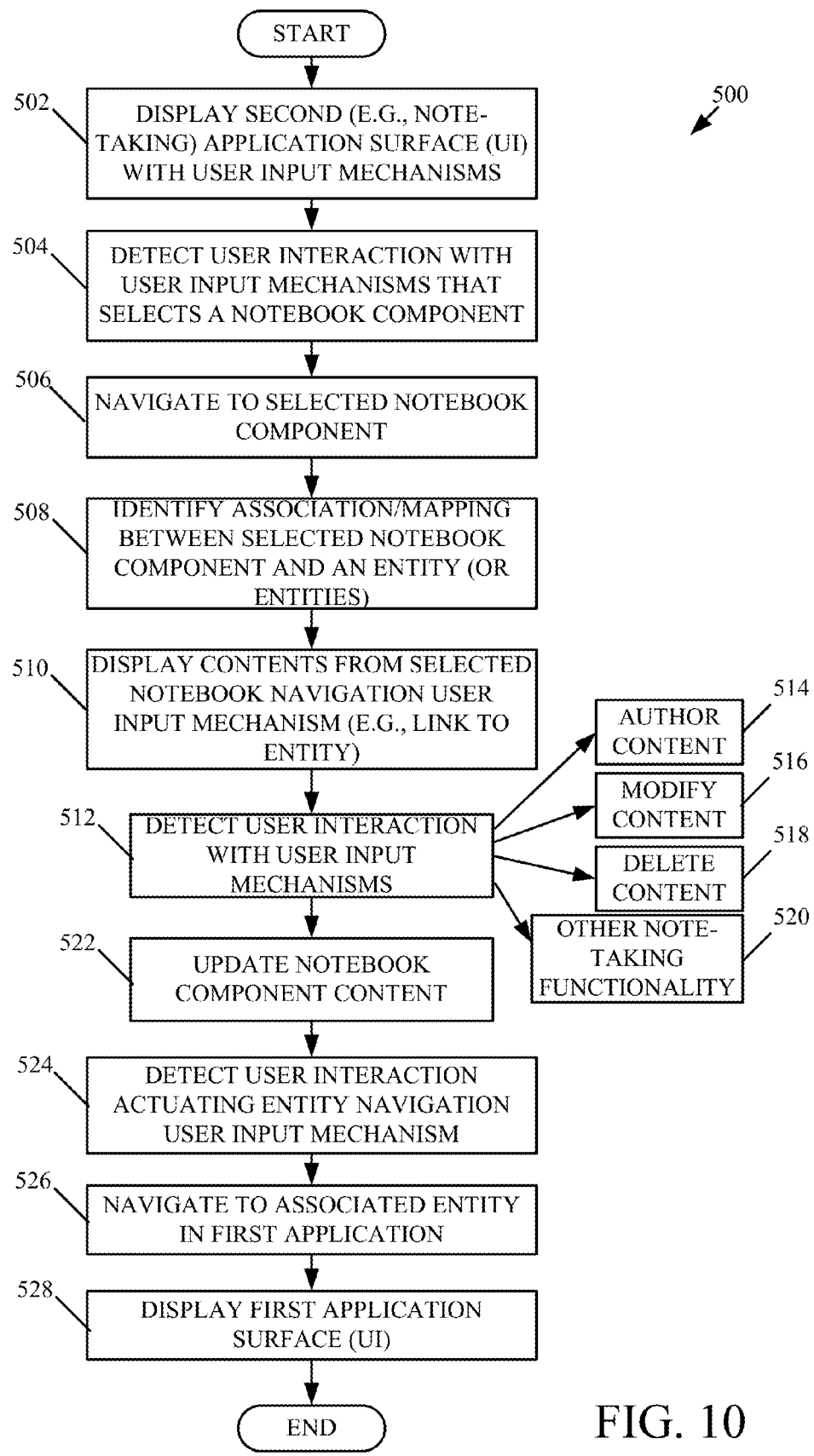
FIG. 10 is a flow diagram of one example of a method for accessing an entity through a note-taking application.

FIG. 10 illustrates one example of a method 500 for accessing an entity through a note-taking application. For sake of illustration, but not by limitation, method 500 will be described in the context of accessing an entity 126 through note-taking application 152.

At step 502, a user interface display, or other application surface, for note-taking application 152 is displayed with user input mechanisms. At step 504, a user interaction with the user input mechanisms is detected that selects a notebook component. Note-taking application 152 navigates to the selected notebook component at step 506. In one example, user 104 navigates through a collection of notebooks to a desired notebook that pertains to a given entity.

At step 508, association component 164 identifies a mapping or other association between the selected notebook component and an entity (or collection of entities) in computing system 102. For example, association component 164 can determine that a selected notebook is associated with a particular opportunity entity stored in data store 116.

Figure 11:
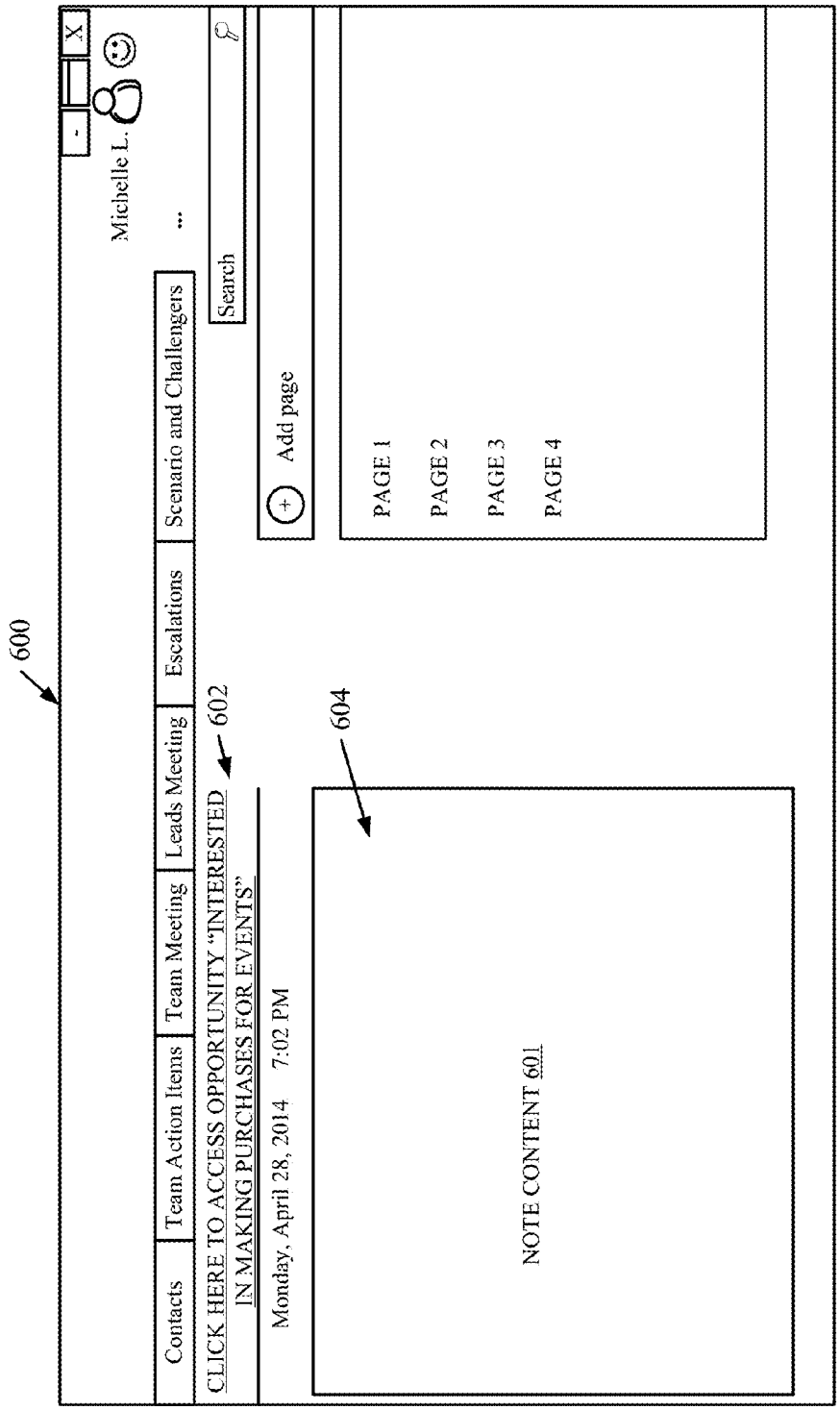
FIG. 11 illustrates one example of a user interface display that displays content from a selected notebook component along with an entity navigation user input mechanism.

At step 510, content from the selected notebook component is displayed along with an entity navigation user input mechanism. For example, the entity navigation user input mechanism can comprise a user actuatable link to the entity in computing system 102. FIG. 11 illustrates one example of a user interface display 600 that displays content 601 from a selected notebook along with an entity navigation user input mechanism 602. Mechanism 602 is visually identified as a user actuatable link that is selectable to navigate the user to the associated entity.

Referring again to FIG. 10, at step 512 user interaction with the user input mechanisms is detected. For example, the user can author content (represented by block 514), modify content (represented by block 516), delete content (represented by block 518), or perform other note-taking functionality (represented by block 520). For instance, in the example of FIG. 11, a user can type additional content into a text entry mechanism 604.

At step 522, the notebook component content is updated in data store 160 based on the user input at step 512. At step 524, a user interaction actuating the entity navigation user input mechanism is detected. In the example of FIG. 11, the user clicks the link provided by mechanism 602 upon which the user is navigated to the associated entity in the first application at step 526. This includes, in the illustrated example, displaying a user interface display for the first application 118 in which the entity and associated content is displayed to the user.

It can thus be seen that the present description provides significant technical advantages. As mentioned above, in illustrated examples the present description leverages rich note-taking functionality of a note-taking application with a first application (such as a CRM application or other application) that does not support such functionality. The note-taking functionality is thus provided within the context of the first application without requiring development on the first application to provide that functionality. Further, by incorporating the functionality of the note-taking application through dynamic associations, the notes provided within the context of the first application are up to date and do not require duplicate storage of data. That is, the notes do not need to be duplicated between the first and second application contexts. This results in a reduced storage overhead and can improve the user experience and efficiency. For instance, by maintaining the mapping between the entities and the corresponding notes, a user can access the notes more quickly without requiring multiple searches to first find a desired entity and then to search for any corresponding notebooks. This results in less computing time and bandwidth as multiple searches to the underlying data storage is not required.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 12:
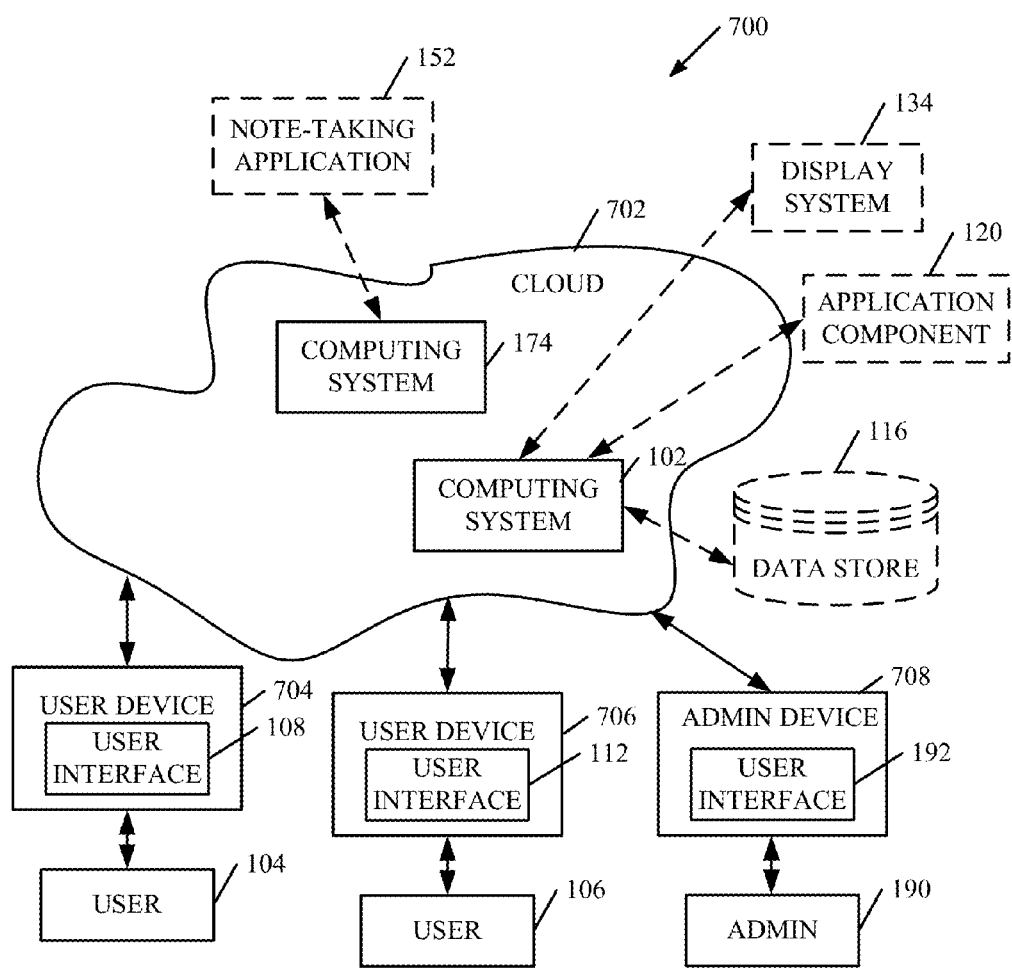
FIG. 12 is a block diagram showing one example of the architecture illustrated in FIG. 1, deployed in a cloud computing architecture.

FIG. 12 is a block diagram of a cloud computing architecture 700. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 12, some items are similar to those shown in FIG. 1 and they are similarly numbered. FIG. 12 specifically shows that some or all components of architecture 100 are located in cloud 702 (which can be public, private, or a combination where portions are public while others are private). Therefore, users 104 and 106 use user devices 704 and 706 to access those components through cloud 702. Similarly, administrator 190 uses an administrator device 708 to access the components through cloud 702.

FIG. 12 also depicts another example of a cloud architecture. FIG. 12 shows that it is also contemplated that some elements of architecture 100 are disposed in cloud 702 while others are not. By way of example, data store 116 can be disposed outside of cloud 702, and accessed through cloud 702. In another example, application component 120 which runs applications 118 can be disposed outside of cloud 702, and accessed through cloud 702. In another example, note-taking application 152 can be disposed outside of cloud 702, and accessed through cloud 702. In another example, display system 134 can be disposed outside of cloud 702, and accessed through cloud 702. Regardless of where they are located, they can be accessed directly by devices 704, 706, and/or 708, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 13:
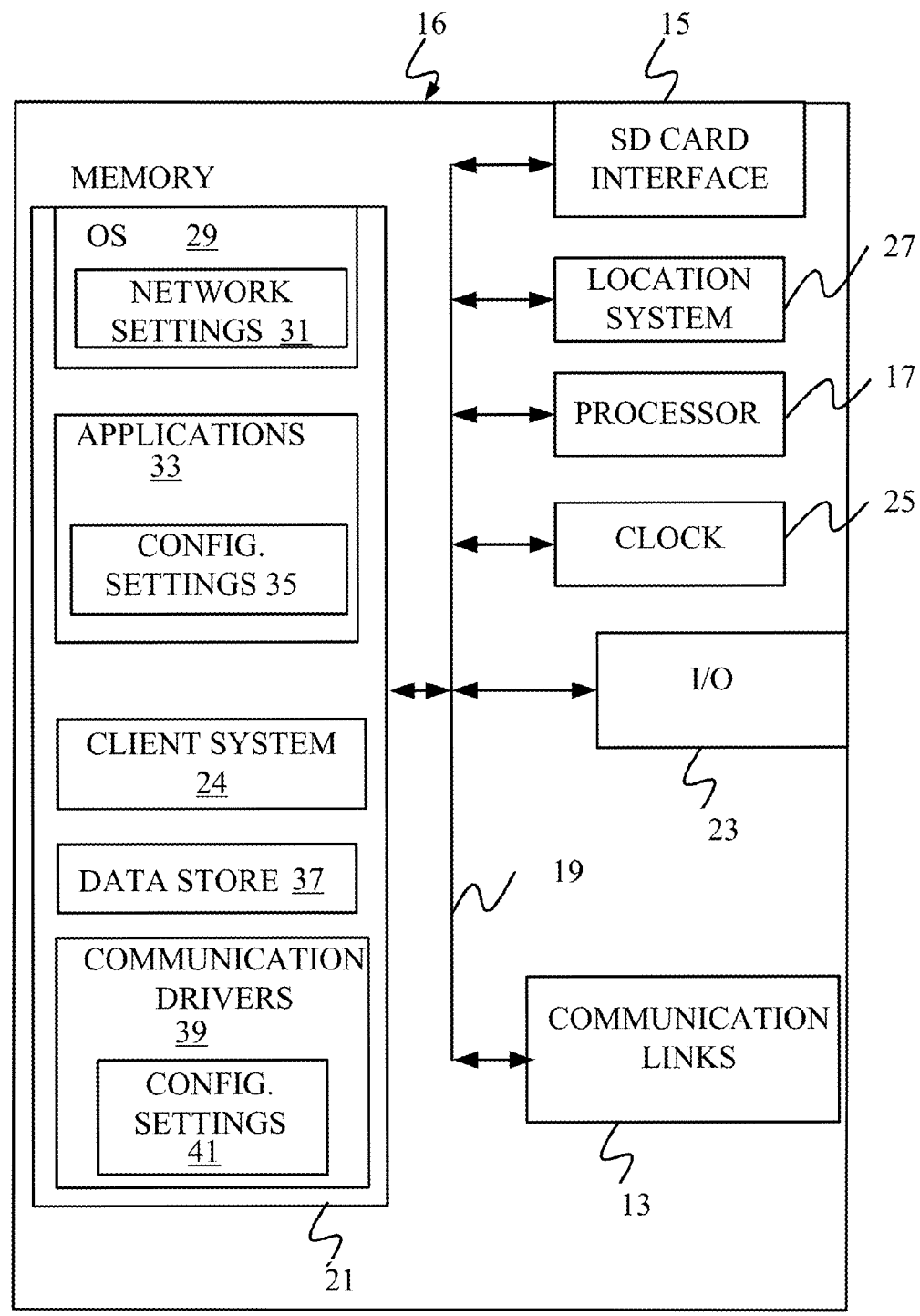
FIGS. 13-15 show various examples of mobile devices that can be used in the architectures discussed in the previous figures.
Figure 14:
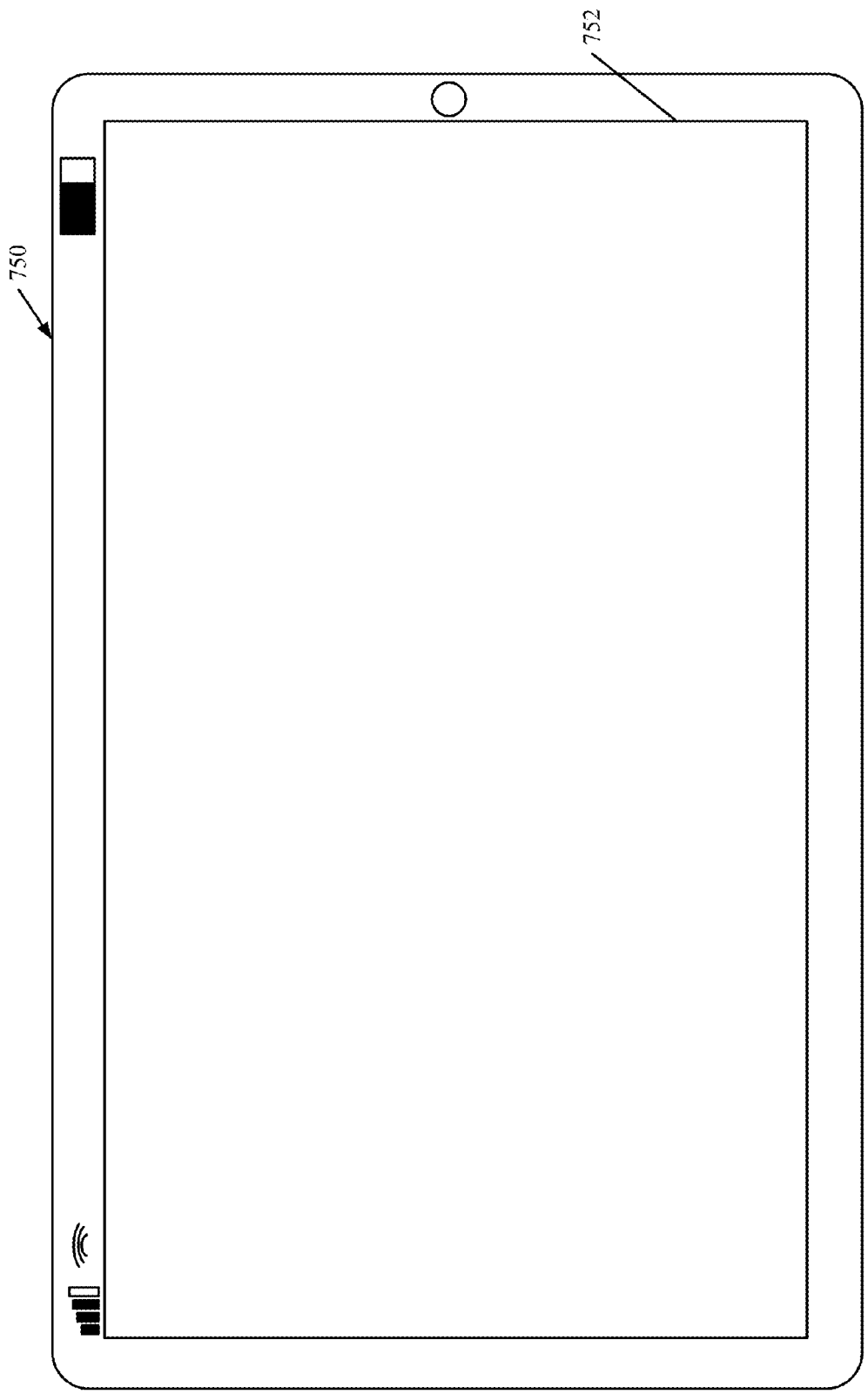
Figure 15:
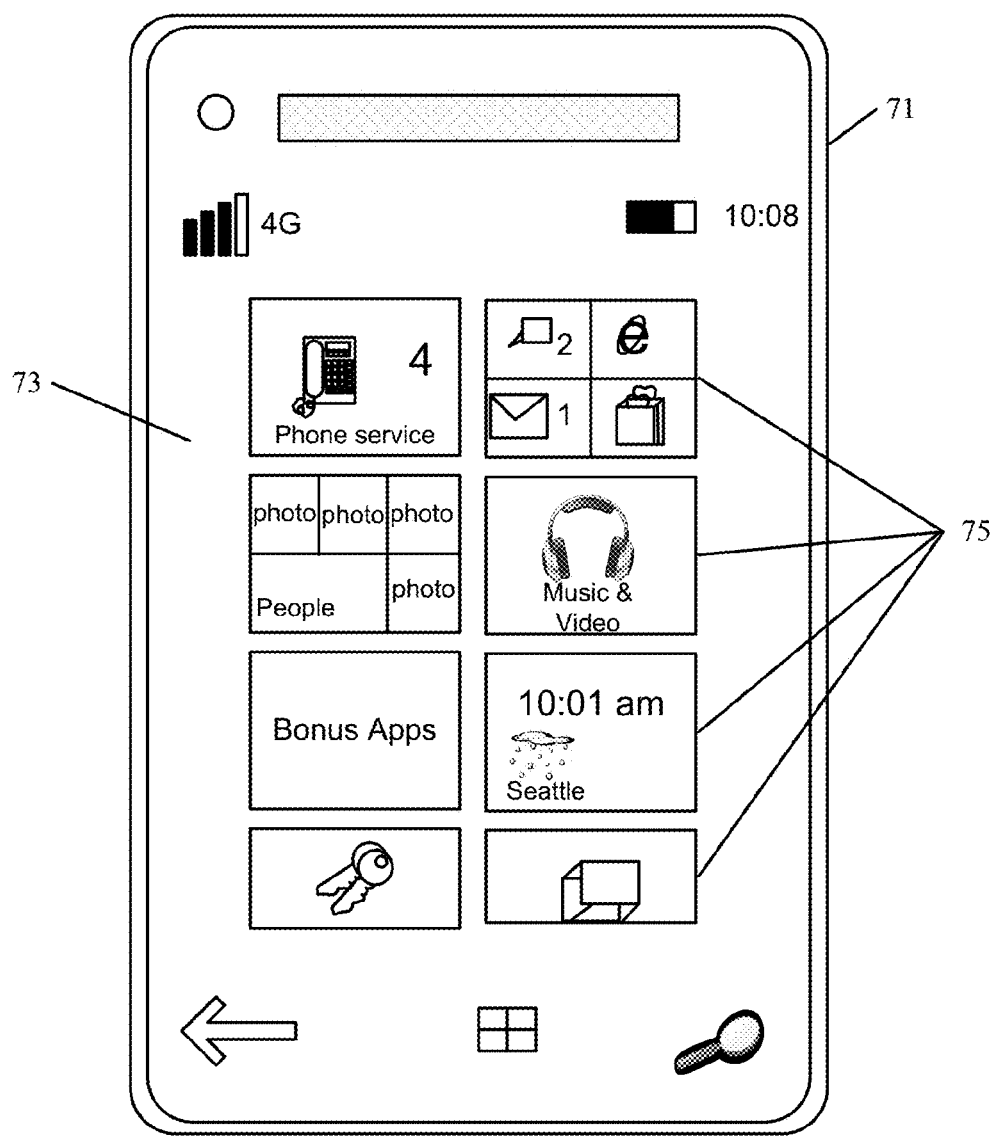

FIG. 13 is a simplified block diagram of one example of a handheld or mobile computing device that can be used as a user's or client's hand held device 16, in which the present system (or parts of it) can be deployed. FIGS. 14-15 are examples of handheld or mobile devices.

FIG. 13 provides a general block diagram of the components of a client device 16 that can run components of architecture 100 or that interacts with architecture 100, or both. In the device 16, a communications link 13 is provided that allows the handheld device to communicate with other computing devices and under some examples provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as 802.11 and 802.11b (Wi-Fi) protocols, and Bluetooth protocol, which provide local wireless connections to networks.

Under other examples, applications or systems are received on a removable Secure Digital (SD) card that is connected to a SD card interface 15. SD card interface 15 and communication links 13 communicate with a processor 17 along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Applications 118 and/or 152, and/or the items in data stores 116 and/or 160, for example, can reside in memory 21. Similarly, device 16 can have a client system 24 which can run various business applications. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 14 shows one example in which device 16 is a tablet computer 750. In FIG. 14, computer 750 is shown with user interface display displayed on the display screen 752. Screen 752 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 750 can also illustratively receive voice inputs as well.

Additional examples of device 16 can be used, as well. Device 16 can be a feature phone, smart phone or mobile phone. The phone includes a set of keypads for dialing phone numbers, a display capable of displaying images including application images, icons, web pages, photographs, and video, and control buttons for selecting items shown on the display. The phone includes an antenna for receiving cellular phone signals such as General Packet Radio Service (GPRS) and 1xrtt, and Short Message Service (SMS) signals. In some examples, phone also includes a Secure Digital (SD) card slot that accepts a SD card.

The mobile device can be personal digital assistant (PDA) or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA also includes a number of user input keys or buttons which allow the user to scroll through menu options or other display options which are displayed on the display, and allow the user to change applications or select user input functions, without contacting the display. Although not shown, The PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one example, mobile device also includes a SD card slot that accepts a SD card.

FIG. 15 shows that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the device 16 are possible.

Figure 16:
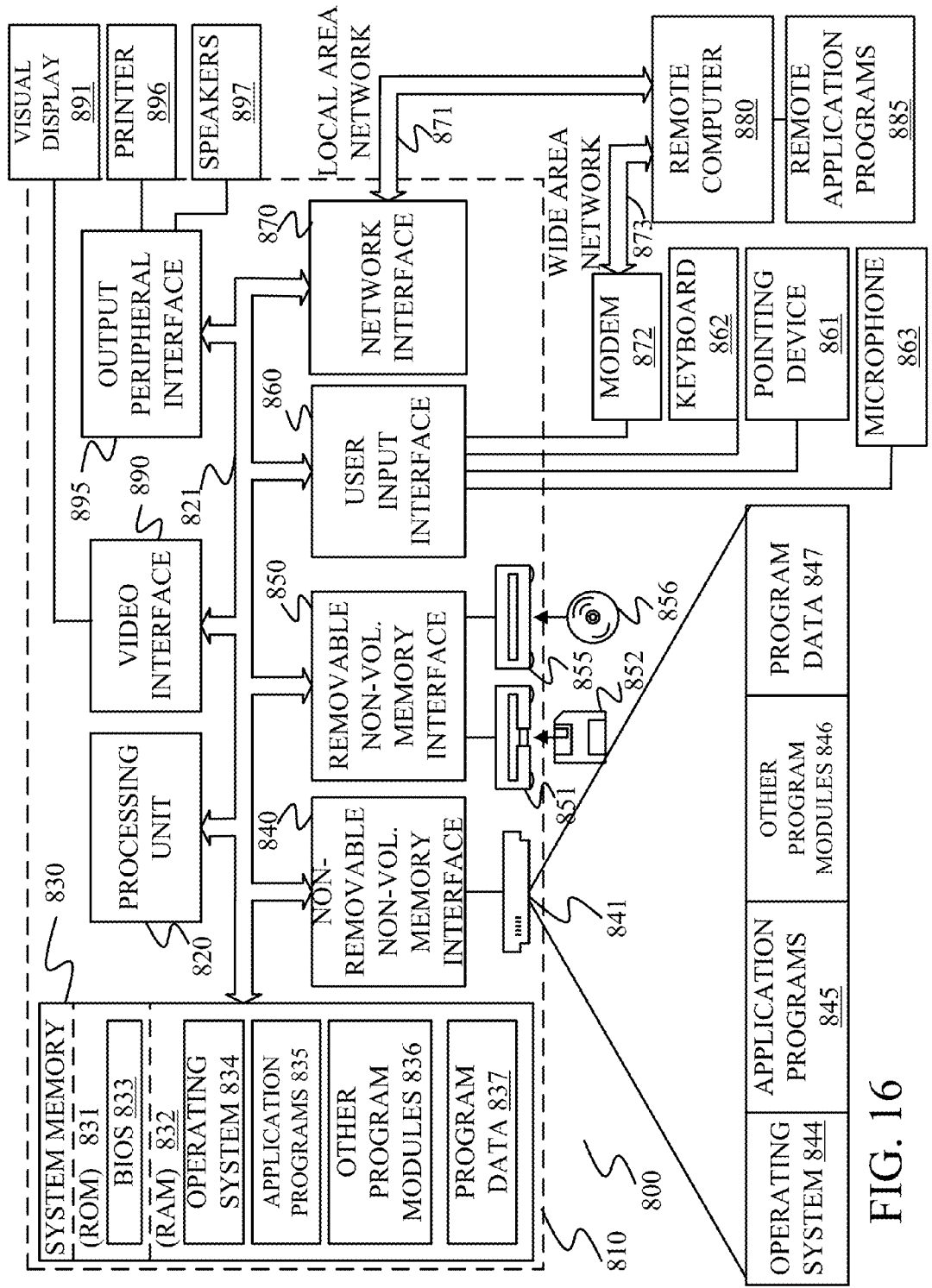
FIG. 16 is a block diagram of one example of a computing environment that can be used in various parts of the architectures set out in the previous figures.

FIG. 16 is one example of a computing environment in which architecture 100, or parts of it, (for example) can be deployed. With reference to FIG. 16, an exemplary system for implementing some examples includes a general-purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 16.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 16 illustrates operating system 834, application programs 835, other program modules 836, and program data 837.

The computer 810 may also include other removable/non-removable volatile/nonvolatile computer storage media. By way of example only, FIG. 16 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 16, provide storage of computer readable instructions, data structures, program modules and other data for the computer 810. In FIG. 16, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 16 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 16 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system comprising a display system configured to generate user interface displays, a first application configured to define an entity in the computing system, an interface component configured to control a second application to generate a notebook component corresponding to the entity, and an association component configured to generate and store an association between the entity and the notebook component. The first application is configured to control the display system to generate a first application user interface display that displays data for the entity in the first application and includes a navigation user input mechanism corresponding to the notebook component in the second application based on the association.

Example 2 is the computing system of any or all previous examples, wherein the second application comprises a note-taking application.

Example 3 is the computing system of any or all previous examples, wherein the first application is configured to control the display system to generate workflow user interface displays with user input mechanisms that detect user inputs to perform workflow tasks in the computing system relative to the entity.

Example 4 is the computing system of any or all previous examples, wherein the notebook component comprises at least one of a notebook, a section within a notebook, or a page within a section of a notebook.

Example 5 is the computing system of any or all previous examples, wherein the association component generates a mapping table having a plurality of entries, each entry mapping an entity in the computing system to a notebook component in the note-taking application.

Example 6 is the computing system of any or all previous examples, wherein the first application is configured to control the display system to generate an entity creation user interface display with user input mechanisms and to detect user interaction with the user input mechanisms that creates the entity within the computing system, and wherein, in response to creation of the entity, the interface component automatically controls the note-taking application to create the notebook component.

Example 7 is the computing system of any or all previous examples, wherein the interface component is configured to receive a location indicator, indicative of a location of the notebook component, from the note-taking application, the association being generated to include the location indicator.

Example 8 is the computing system of any or all previous examples, wherein the interface component controls the note-taking application to populate the notebook component with a link to the entity in the computing system.

Example 9 is the computing system of any or all previous examples, and further comprising a preview generator configured to generate a preview of content in the notebook application, the preview being displayed in first application user interface display.

Example 10 is the computing system of any or all previous examples, wherein the interface component is configured to receive an indication, from the second application, of a second notebook component that is associated with the entity, and to control the association component to generate and store a second association between the entity and the second notebook component.

Example 11 is the computing system of any or all previous examples, and further comprising a configuration component configured to control the display system to generate a configuration user interface display with user input mechanism and to detect user interaction with the user input mechanisms that selects a set of entity types for which to generate notebook components.

Example 12 is the computing system of any or all previous examples, and further comprising a collaboration component that facilitates collaborative access by a plurality of users to the notebook component, wherein the plurality of users share the notebook component relative to the entity.

Example 13 is the computing system of any or all previous examples, wherein the interface component is configured to transmit content related to the entity from the first application to the second application, for storage in the notebook component.

Example 14 is the computing system of any or all previous examples, wherein the user input mechanism corresponding to the notebook component comprises a navigation link that, when actuated by a user, navigates the user to the notebook component in the second application.

Example 15 is a computing system comprising a display system configured to generate user interface displays with user input mechanisms, a notebook creation component configured to create a notebook component, an association component configured to identify an entity associated with the notebook component, a display system controller configured to control the display system to generate a notebook component user interface display that displays content of the notebook component along with a user actuatable navigation link to the entity.

Example 16 is the computing system of any or all previous examples, wherein the notebook creation component comprises a component of a first, note-taking application, and the computing system is configured to detect a user interaction with the notebook component user interface display that actuates the navigation link to the entity and, in response, communicate an indication of the actuation to a second application, that is different than the first application, to generate a user interface display corresponding to the entity.

Example 17 is the computing system of any or all previous examples, wherein the computing system is configured to detect a user interaction with the user input mechanisms that identifies a second notebook component as being associated with the entity, and to communicate an indication of the second notebook component to the second application.

Example 18 is a computer-implemented method comprising generating a user interface display with user input mechanisms, detecting user interaction with the user input mechanisms that defines an entity in a computing system, generating a first notebook component for the entity, storing an association record that associates the first notebook component with the entity, detecting an input that identifies a second notebook component that is selected by a user as being associated with the entity, and in response to detecting the input, storing an association record that associates the second notebook component with the entity.

Example 19 is the computer-implemented method of any or all previous examples, wherein the entity and the first notebook component are generated within different application contexts.

Example 20 is the computer-implemented method of any or all previous examples, and further comprising generating an entity view user interface display that displays information stored in association with the entity along with user interface elements that identify the first and second notebook components.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What is claimed is:

1. A computing system comprising:
   a processor; and
   memory storing instructions executable by the processor, wherein the instructions configure the computing system to provide:
   a first application configured to define a data object and including a workflow configured to operate on the data object;
   an interface component configured to control a second application to generate a notebook component corresponding to the data object, the second application being distinct from the first application and including note-taking functionality; and
   an association component configured to:
   generate an association between the data object and the notebook component, and
   store the association in a data store associated with the first application; and
   wherein the first application is configured to:
   generate a representation of a user interface display that includes data for the data object, and
   a user input mechanism corresponding to the notebook component in the second application; and based on an indication of user actuation of the user
   input mechanism, control the second application
   to access the notebook component based on the
   stored association.
2. The computing system of claim 1, wherein the second application comprises a note-taking application.
3. The computing system of claim 2, wherein the representation of the user interface display includes a workflow user input mechanism, and wherein the first application is configured to:
   based on an indication of user actuation of the workflow user input mechanism, perform the workflow on the data object.
4. The computing system of claim 2, wherein the notebook component comprises at least one of a notebook, a section within a notebook, or a page within a section of a notebook.
5. The computing system of claim 2, wherein the generated association comprises a mapping table having a plurality of entries, each entry mapping a data object in the computing system to a notebook component in the note-taking application.
6. The computing system of claim 2, wherein the first application is configured to:
   generate a representation of a data object creation user interface display having a data object creation user input mechanism; and
   based on an indication of user actuation of the data object creation user input mechanism, create the data object within the computing, system, and
   wherein, in response to creation of the data object, the interface component is configured to automatically control the note-taking application to create the notebook component.
7. The computing system of claim 6, wherein the interface component is configured to receive a location indicator, indicative of a location of the notebook component, from the note-taking application, and the association component is configured to generate the association to include the location indicator.
8. The computing system of claim 6, wherein the note-taking application is configured to populate the notebook component with a link to the data object in the computing system.
9. The computing system of claim 1, wherein the instructions configure the computing system to provide:
   a preview generator configured to generate a preview of content in the notebook component corresponding to the data object, wherein the representation of the user interface display includes the preview.
10. The computing system of claim 1, wherein the interface component is configured to:
    receive an indication, from the second application, of a second notebook component that is associated with the data object, and
    control the association component to generate and store a second association between the data object and the second notebook component.
11. The computing system of claim 1, wherein the instructions configure the computing system to provide:
    a configuration component configured to:
       generate a representation of a configuration user interface display with a configuration user input mechanism, and
       based on an indication of user actuation of the configuration user input mechanism, select a set of data object types for which to generate notebook components.
12. The computing system of claim 1, wherein the instructions configure the computing system to provide:
    a collaboration component configured to facilitate collaborative access by a plurality of users to the notebook component, wherein the plurality of users share the notebook component relative to the data object.
13. The computing system of claim 1, wherein the interface component is configured to transmit content related to the data object from the first application to the second application, for storage in the notebook component.
14. The computing system of claim 1, wherein the user input mechanism comprises a navigation link, and the first application is configured to:
    based on an indication of user actuation of the navigation link, control the second application to navigate the user to the notebook component in the second application.
15. A computing system comprising:
    a notebook creation component configured to receive an instruction, from a application, and, based on the received instruction, create a notebook component;
    association component configured to identify an entity a data object stored in a data store associated with the first application, the data object being stored in association with the notebook component; and
    a display system configured generate a representation of a notebook component user interface display that includes content of notebook component along with a user actuatable navigation link to the data object.
16. The computing system of claim 15, wherein the notebook creation component comprises a component of a second application, distinct from the first application, and wherein the computing system is configured to:
    based on an indication of user actuation of the navigation link, provide an instruction to the first application to generate a user interface display corresponding to the data object.
17. The computing system of claim 16, wherein the computing system is configured to:
    define a second notebook component,
    associate the second notebook component with the data object, and
    communicate an indication of the second notebook component to the first application.
18. A computer-implemented method comprising:
    defining, by a first application, a data object, the application including a workflow configured to operate on the data object;
    controlling a second application to generate a first notebook component for the data object, the second application being distinct from the first application and including note-taking functionality;
    generating an association record that associates the first notebook component with the data object;
    storing the association record in a data store associated with the first application;
    generating a representation of a user interface display having a notebook navigation user input mechanism;
    receiving an indication of user actuation of the notebook navigation user input mechanism; and
    based on the indication of user actuation of the notebook navigation user input mechanism, identifying a second notebook component and storing an association record that associates the second notebook component with the data object.

19. The computer-implemented method of claim 18, wherein the data object and the first notebook component are generated within different application contexts.

20. The computer-implemented method of claim 18, further comprising:
- generating a representation of a configuration user interface display with a configuration user input mechanism;
- based on an indication of user actuation of the configuration user input mechanism, selecting a set of data objects types for which to generate notebook components; and
- generating a representation of a data object user interface display that displays information stored in association with data objects of the selected data object types.

* * * * *